Jan. 26, 1960 C. E. ADLER ET AL 2,922,361
PRINTER
Filed Nov. 1, 1957 15 Sheets-Sheet 1
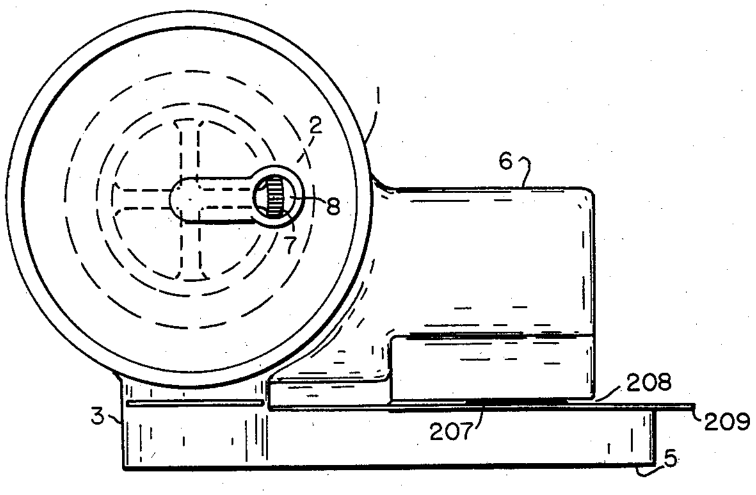
Fig. I
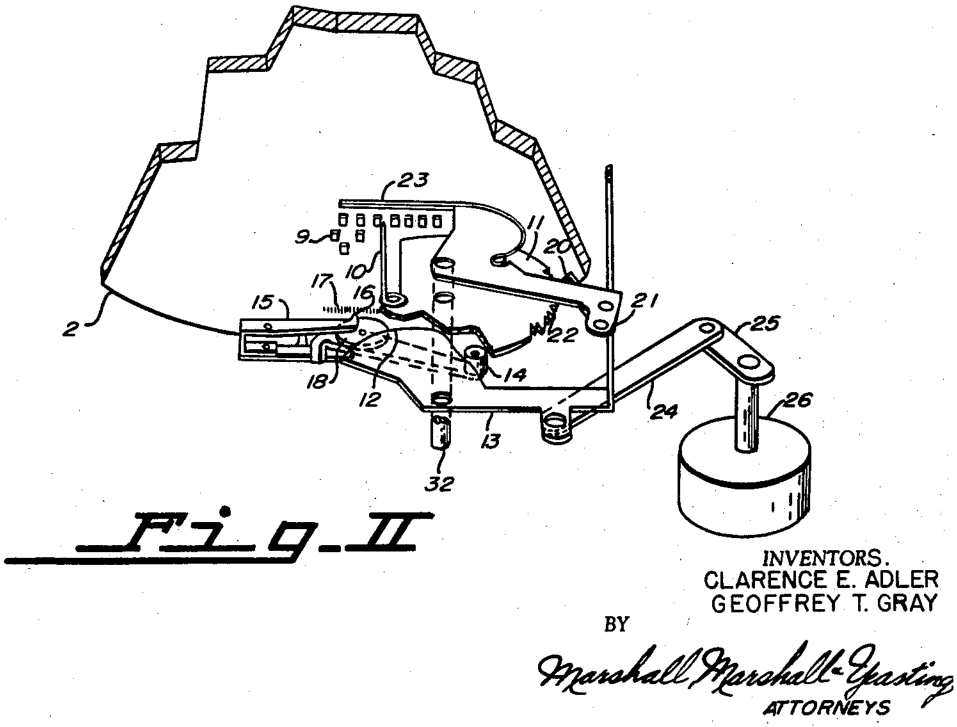
Fig. II
INVENTORS.
CLARENCE E. ADLER
GEOFFREY T. GRAY
BY
Marshall, Marshall & Yeasting
ATTORNEYS

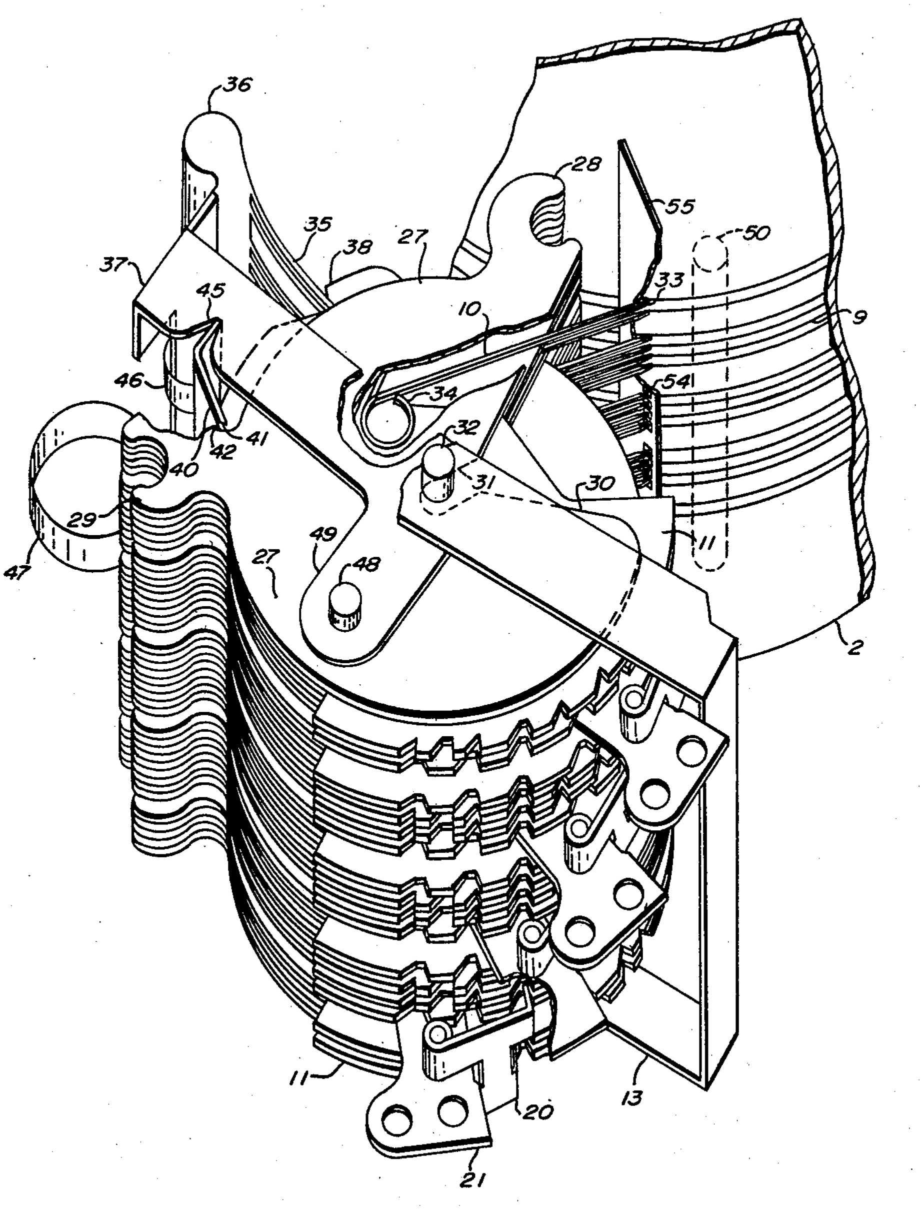
Fig. III
INVENTORS.
CLARENCE E. ADLER
GEOFFREY T. GRAY
BY
Marshall, Marshall & Yeasting
ATTORNEYS

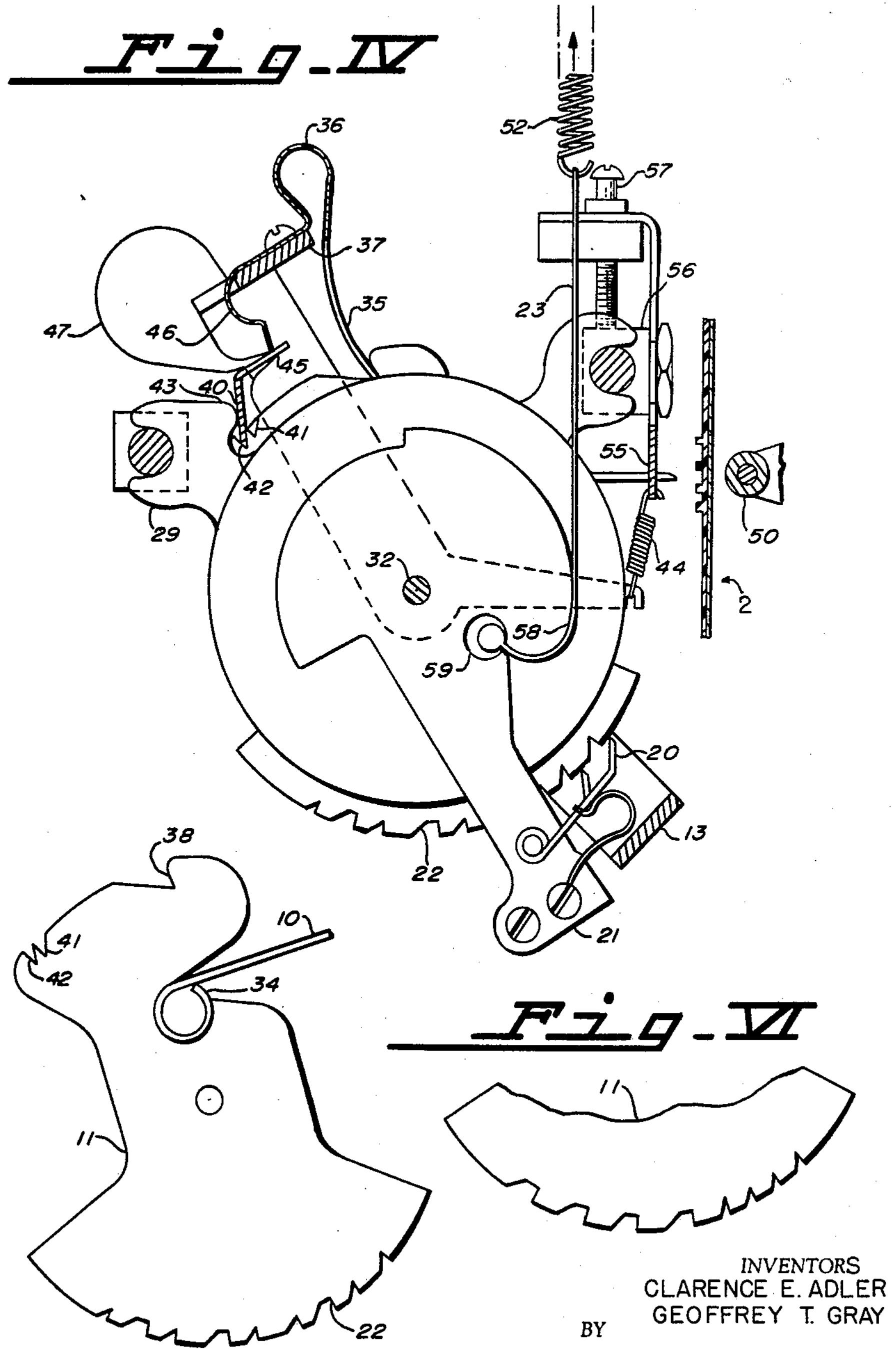
Fig. IV, Fig. V, Fig. VI
INVENTORS
CLARENCE E. ADLER
GEOFFREY T. GRAY
BY
Marshall, Marshall & Yeasting
ATTORNEYS Jan. 26, 1960 C. E. ADLER ET AL 2,922,361
PRINTER
Filed Nov. 1, 1957 15 Sheets-Sheet 4
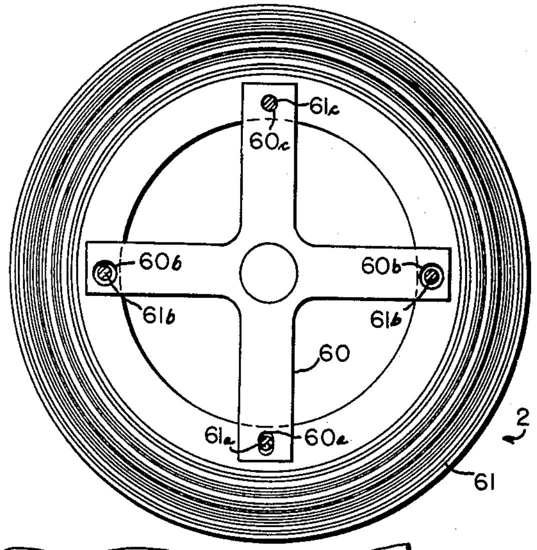
Fig. VII
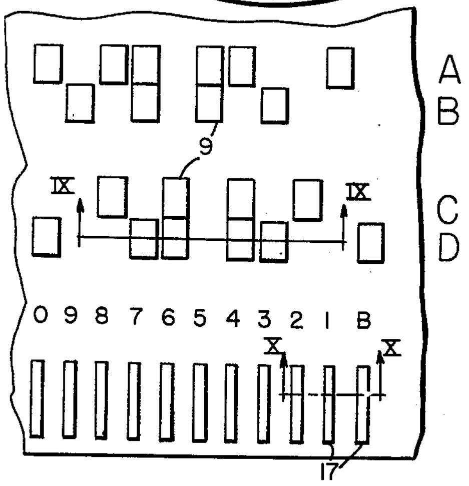
Fig. VIII
| CODE | | | | |
|---|---|---|---|---|
| | A | B | C | D |
| BLANK | | | | D |
| 0 | A | | | D |
| 1 | A | | | |
| 2 | | | C | |
| 3 | | B | | D |
| 4 | A | | C | D |
| 5 | A | B | | |
| 6 | | | C | D |
| 7 | A | B | | D |
| 8 | A | | C | |
| 9 | | B | | |
Fig. XI
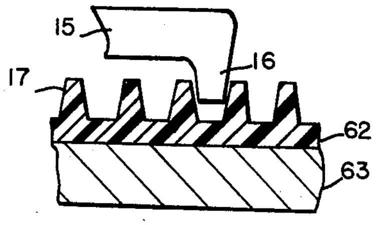
Fig. X
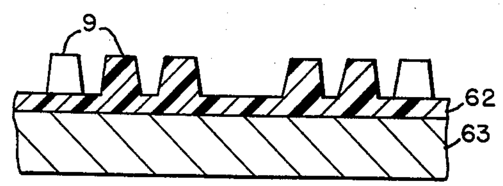
Fig. IX
INVENTORS.
CLARENCE E. ADLER
GEOFFREY T. GRAY
BY
Marshall, Marshall & Yeasting
ATTORNEYS Jan. 26, 1960 C. E. ADLER ET AL 2,922,361
PRINTER
Filed Nov. 1, 1957 15 Sheets-Sheet 5
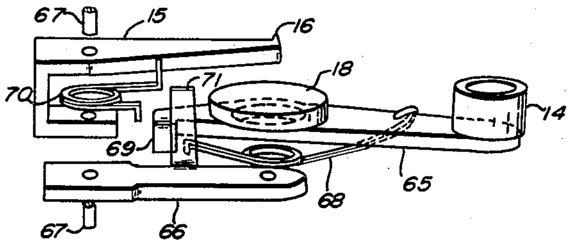
Fig. XII
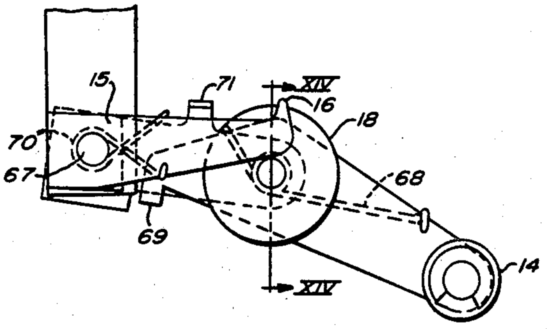
Fig. XIII
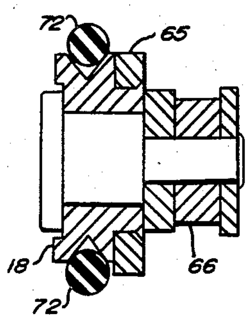
Fig. XIV
INVENTORS.
CLARENCE E. ADLER
GEOFFREY T. GRAY
BY
Marshall, Marshall & Yeasting
ATTORNEYS

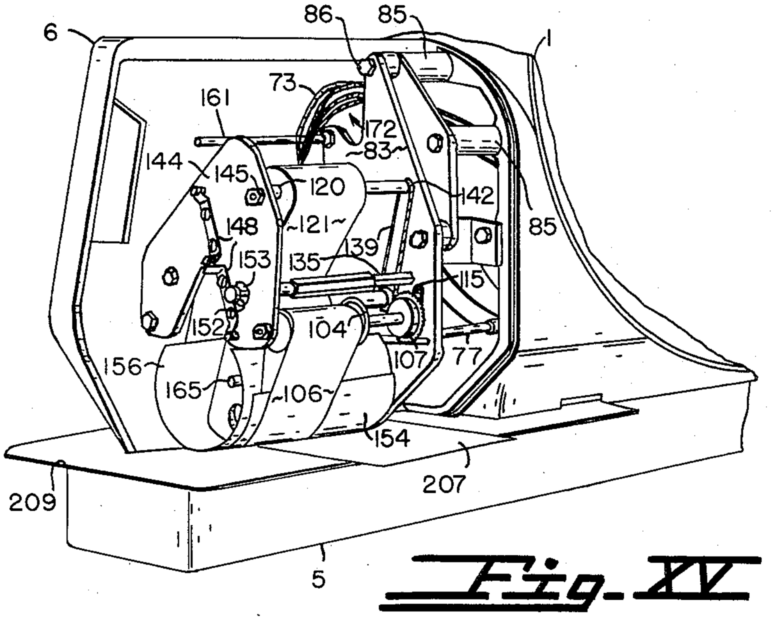
Fig. XV
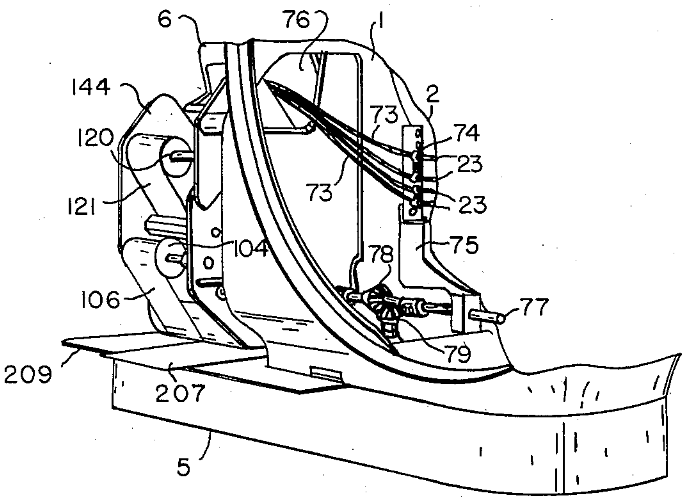
Fig. XVI
INVENTORS.
CLARENCE E. ADLER
GEOFFREY T. GRAY
BY
Marshall, Marshall & Yeasting
ATTORNEYS

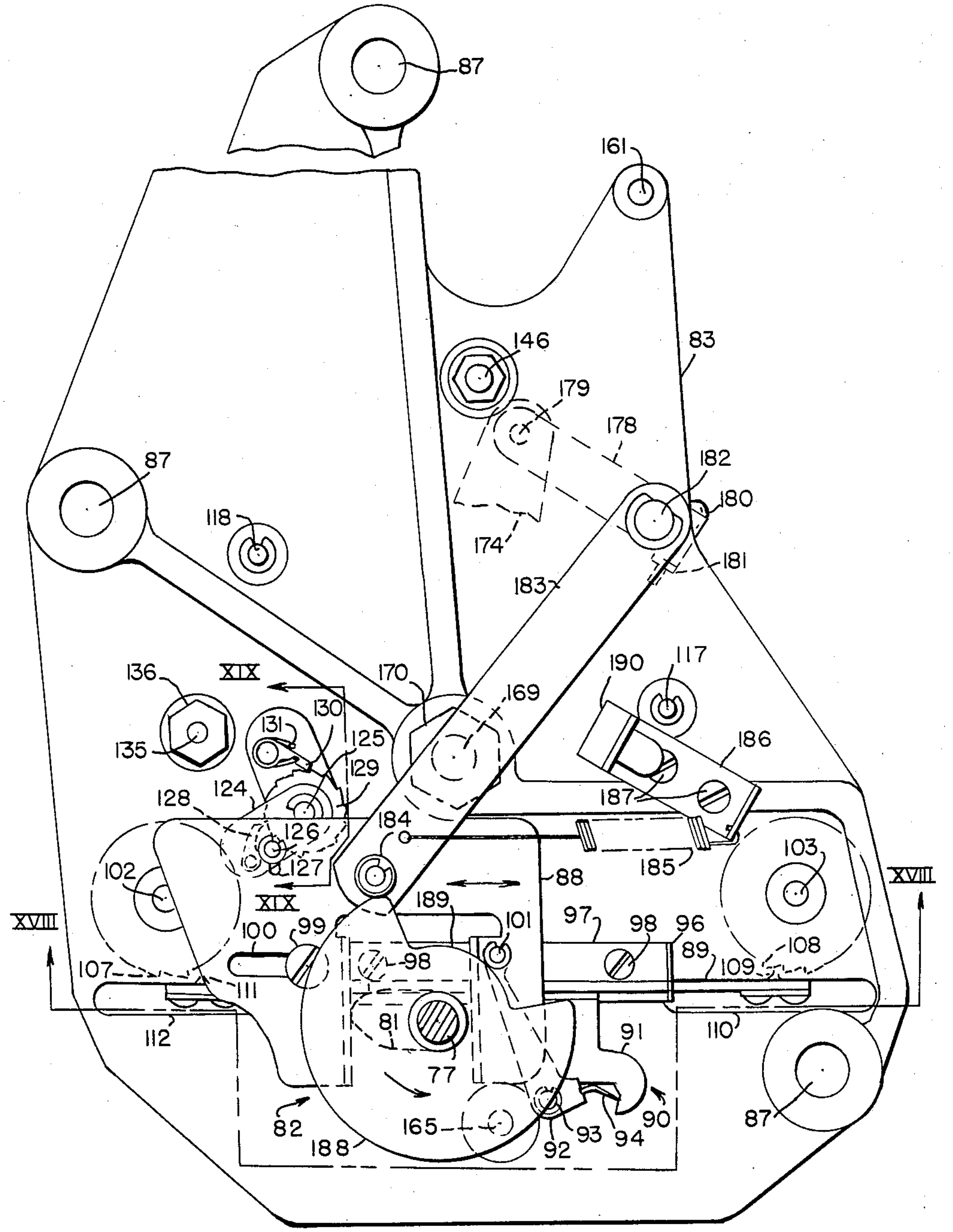
Fig. XVII
INVENTORS.
CLARENCE E. ADLER
GEOFFREY T. GRAY
BY
Marshall, Marshall & Yeasting
ATTORNEYS

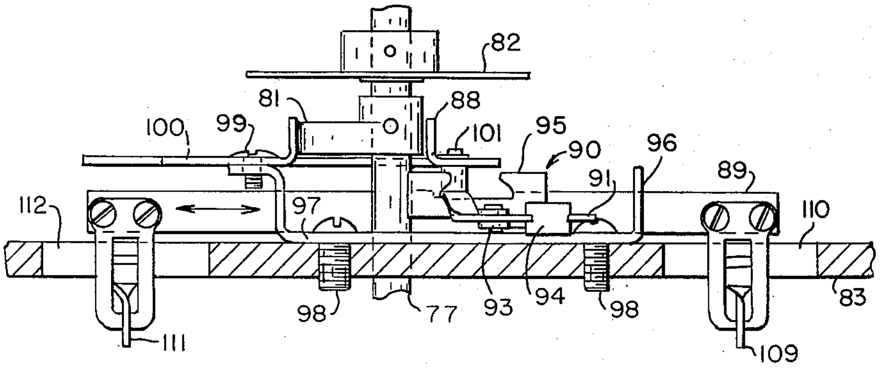
Fig. XVIII
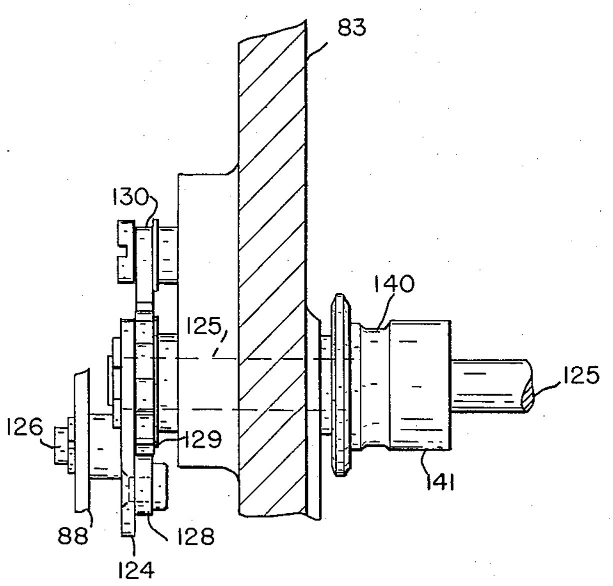
Fig. XIX
INVENTORS.
CLARENCE E. ADLER
GEOFFREY T. GRAY
BY
Marshall, Marshall & Yeasting
ATTORNEYS Jan. 26, 1960 C. E. ADLER ET AL 2,922,361
PRINTER
Filed Nov. 1, 1957 15 Sheets-Sheet 9
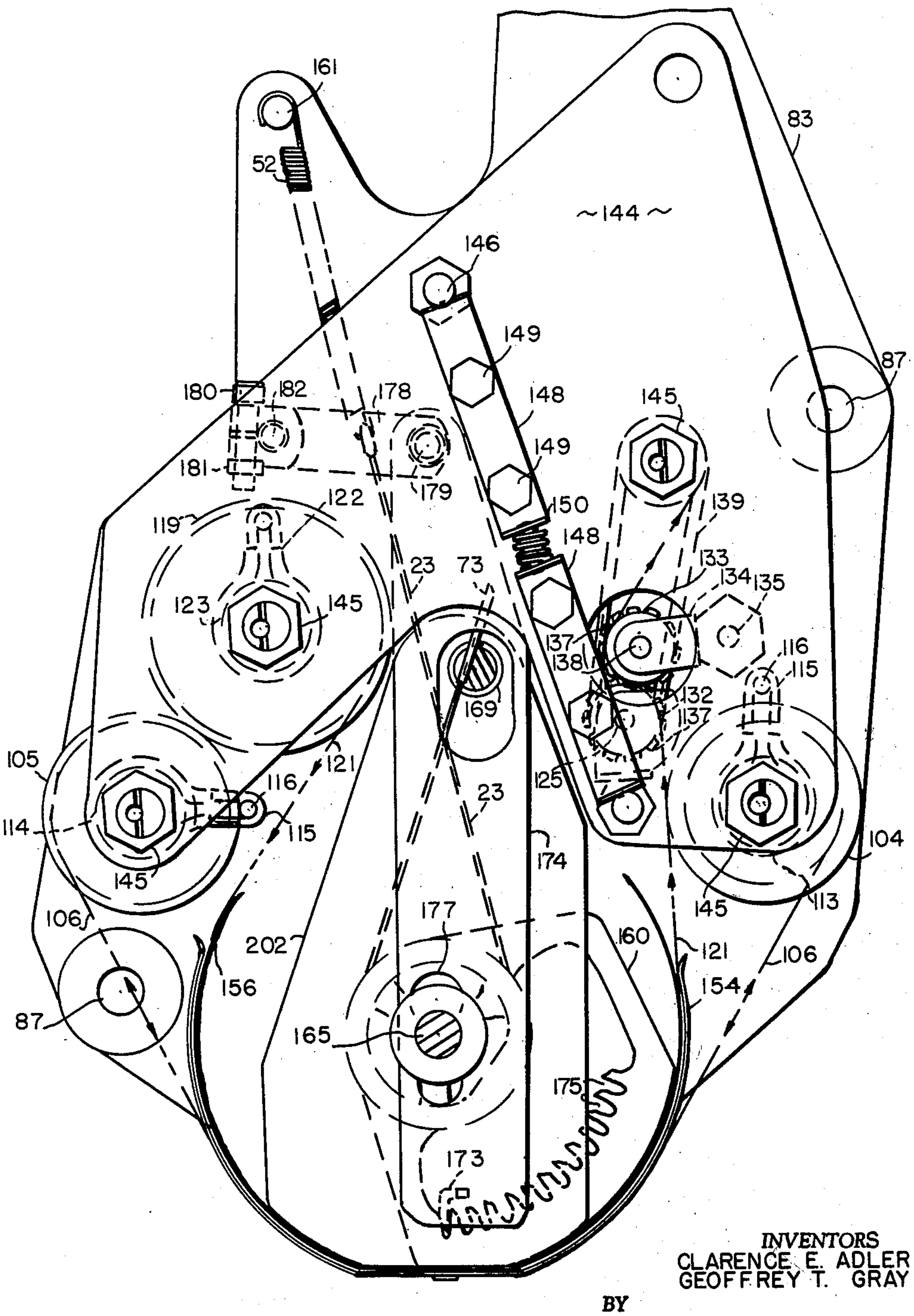
Fig. XX
INVENTORS
CLARENCE E. ADLER
GEOFFREY T. GRAY
BY
Marshall, Marshall & Yeasting
ATTORNEYS

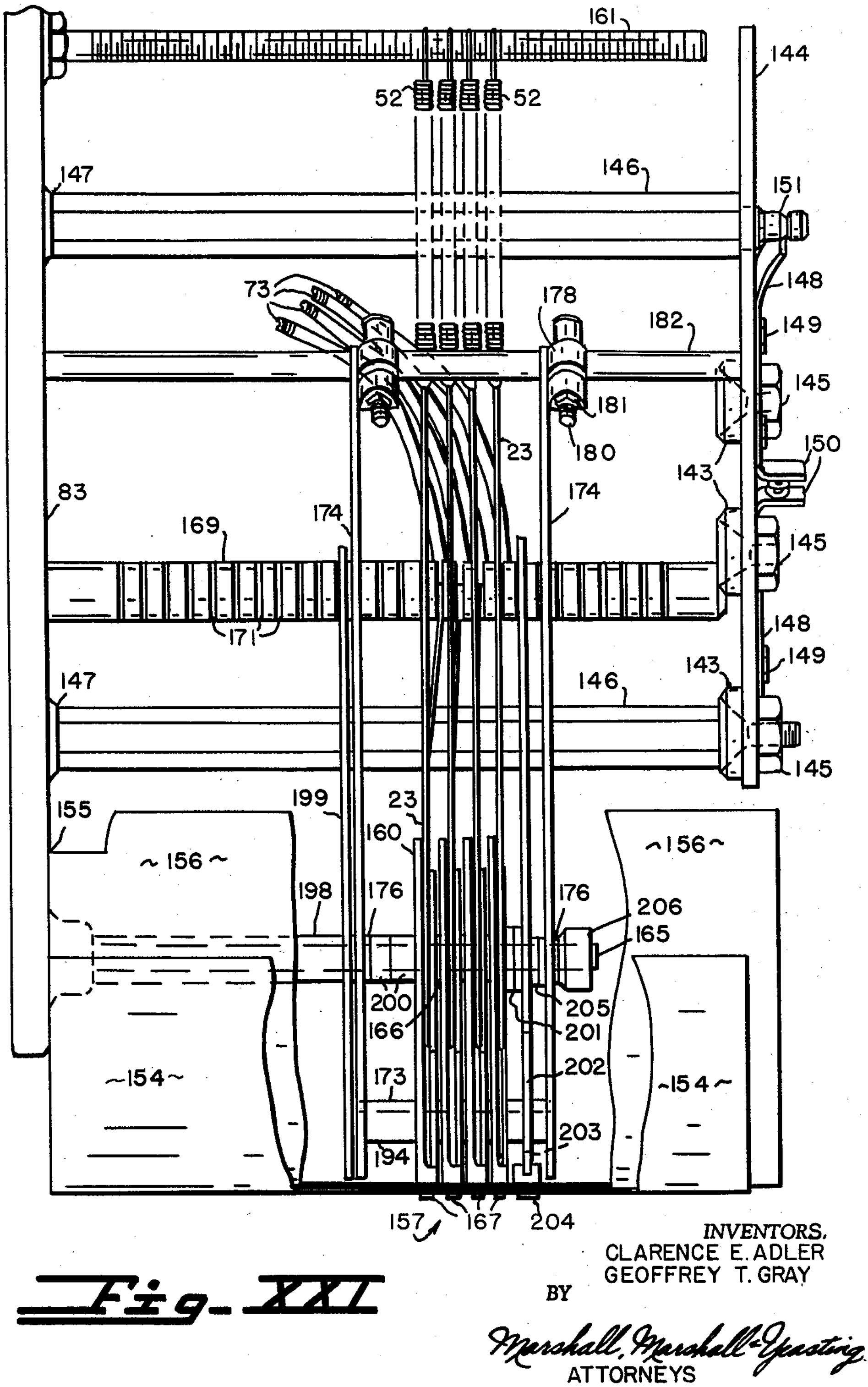
Fig. XXI
INVENTORS.
CLARENCE E. ADLER
GEOFFREY T. GRAY
BY
Marshall, Marshall & Yeasting
ATTORNEYS Jan. 26, 1960 C. E. ADLER ET AL 2,922,361
PRINTER
Filed Nov. 1, 1957 15 Sheets-Sheet 11
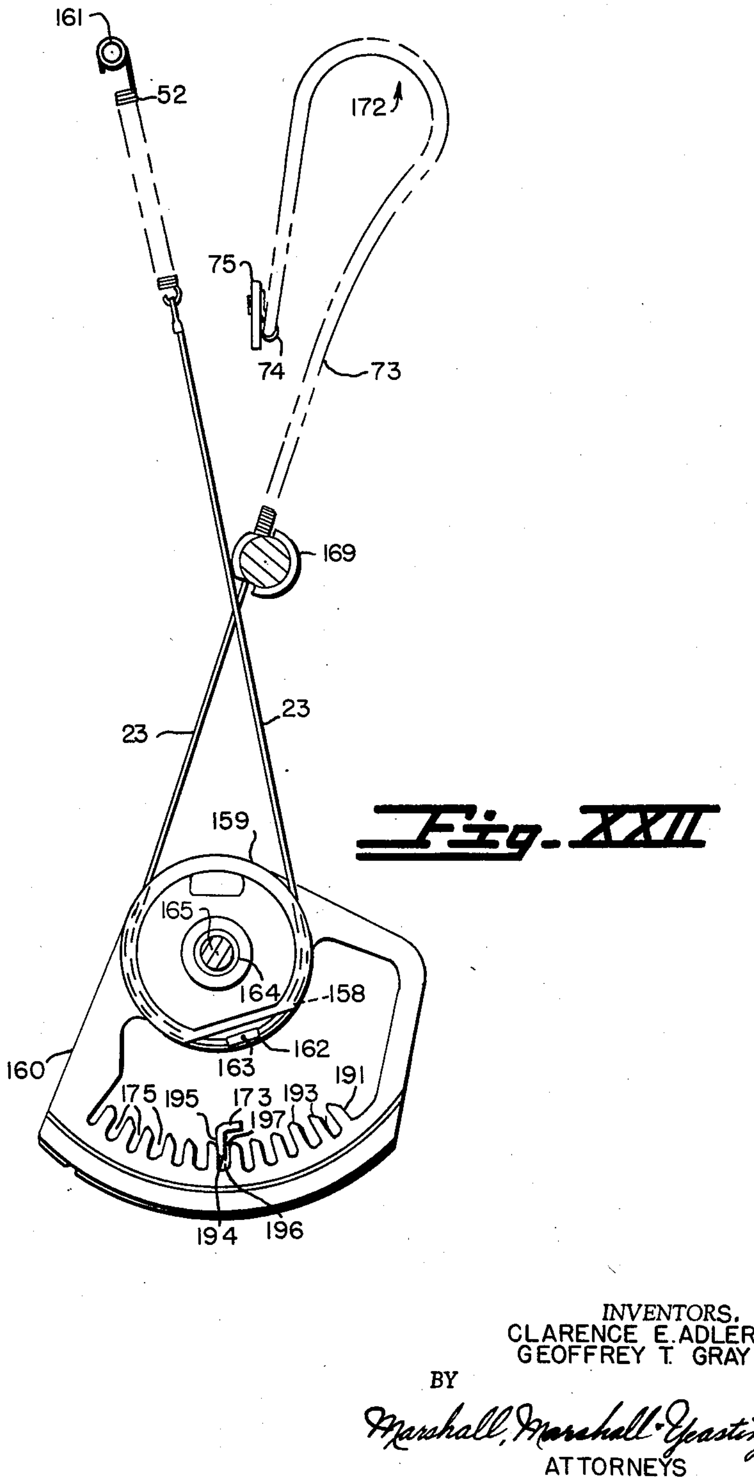
Fig. XXII
INVENTORS.
CLARENCE E. ADLER
GEOFFREY T. GRAY
BY
Marshall, Marshall & Yeasting
ATTORNEYS Jan. 26, 1960 C. E. ADLER ET AL 2,922,361
PRINTER
Filed Nov. 1, 1957 15 Sheets-Sheet 12
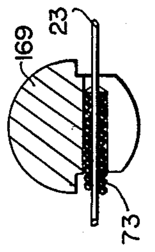
Fig. XXIV
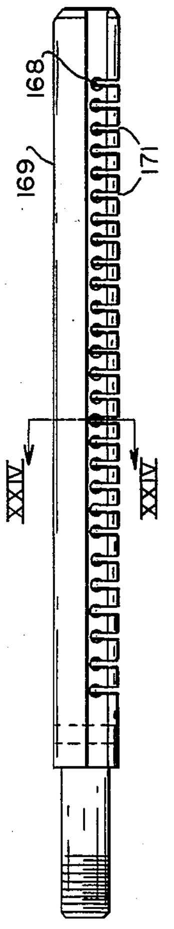
Fig. XXIII
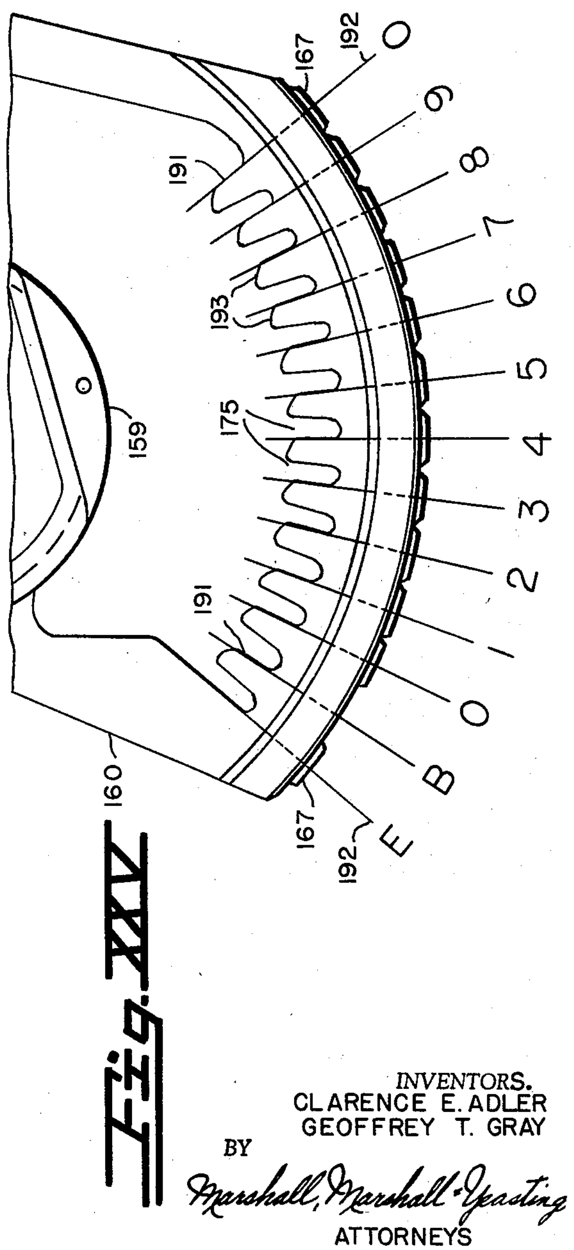
Fig. XXV
INVENTORS.
CLARENCE E. ADLER
GEOFFREY T. GRAY
BY
Marshall, Marshall & Yeasting
ATTORNEYS Jan. 26, 1960 C. E. ADLER ET AL 2,922,361
PRINTER
Filed Nov. 1, 1957 15 Sheets-Sheet 13
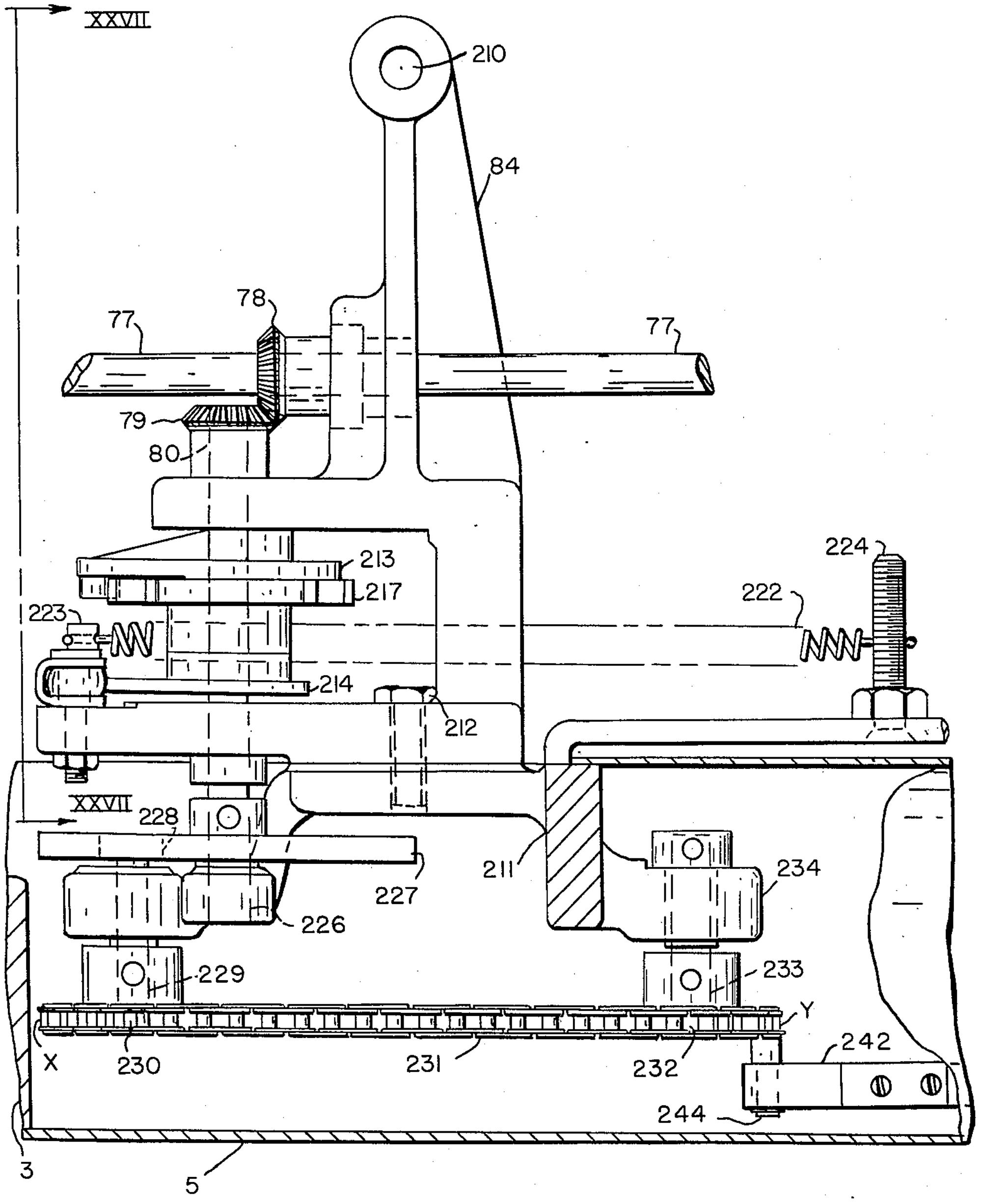
Fig. XXVI
INVENTORS.
CLARENCE E. ADLER
GEOFFREY T. GRAY
BY
Marshall, Marshall & Yeasting
ATTORNEYS

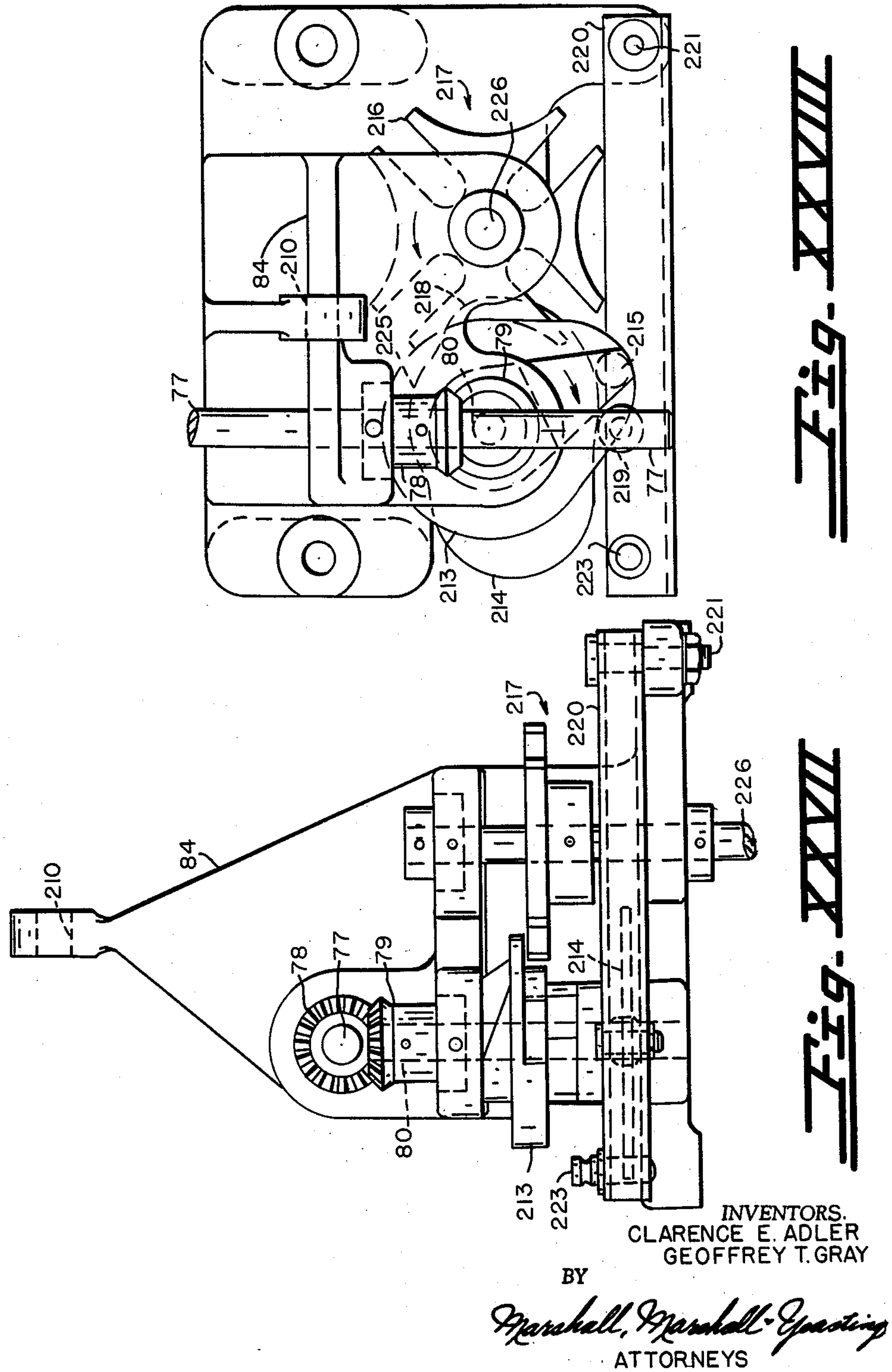
Fig. XXVIII, Fig. XXVII
INVENTORS.
CLARENCE E. ADLER
GEOFFREY T. GRAY
BY
Marshall, Marshall - Yeasting
ATTORNEYS Jan. 26, 1960 C. E. ADLER ET AL 2,922,361
PRINTER
Filed Nov. 1, 1957 15 Sheets-Sheet 15
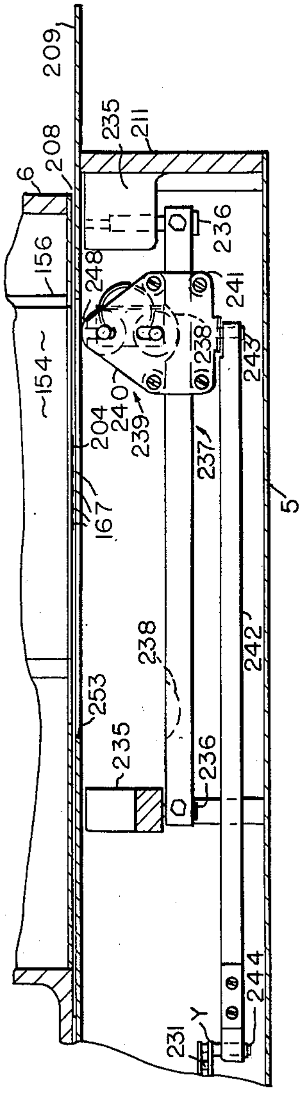
FIG. XIX
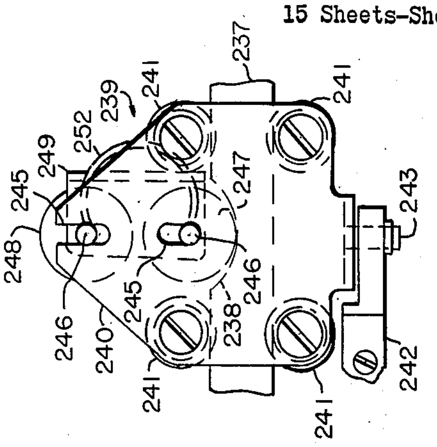
FIG. XX
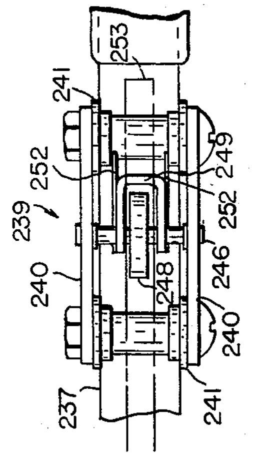
FIG. XXI
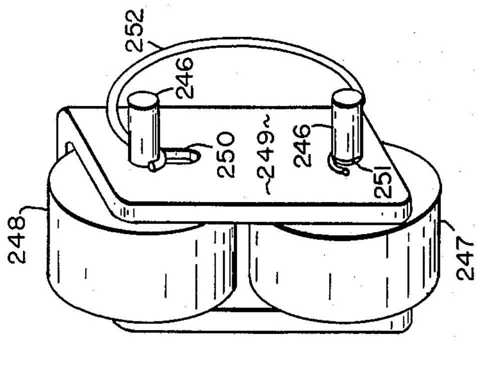
FIG. XXII
INVENTORS.
CLARENCE E. ADLER
GEOFFREY T. GRAY
BY
Marshall, Marshall & Yeasting
ATTORNEYS United States Patent Office 2,922,361

Patented Jan. 26, 1960

2,922,361

PRINTER

Clarence E. Adler and Geoffrey T. Gray, Toledo, Ohio, assignors, by mesne assignments, to Toledo Scale Corporation, Toledo, Ohio, a corporation of Ohio Application November 1, 1957, Serial No. 693,975

12 Claims. (Cl. 101—95)

This invention relates to an improved printing device.

Printing devices often include type positioning mechanism for aligning a plurality of printing members, such as type wheels or sectors, each having a series of printing type and a series of locating notches positioned with respect to the raised printing type. The type positioning mechanism often includes a driven member upon which is mounted a centering bar that is used to align the locating notches finally after the printing members have been selectively positioned approximately. Heretofore, such type positioning mechanism generally has been unsatisfactory because the centering bar fitted closely in the locating notches and when the notches were of different sizes and depths and/or the axes of rotation of the printing members and the driven member were not parallel, as may occur in mass production manufacturing, it was impossible for a single centering bar to align the printing members accurately so that they would print in a straight line. That is, a single centering bar which fits closely in such locating notches cannot perfectly align the notches unless the bottoms of a row of equally sized notches extend in a straight line that is parallel to the centering bar.

After the type positioning mechanism has positioned the printing members finally and while such members are locked in their final positions by the type positioning mechanism, a roller printer often is used to press an element to be printed, such as a ticket, against the printing type on the printing members. Heretofore, many roller printers have been driven both on a forward printing stroke and on a return stroke for each printing operation, which often caused double impressions of the printing type, and, in order to accommodate elements to be printed of different thicknesses, it has been necessary selectively to adjust the pressure with which the roller printers pressed the elements against the printing type. Attempts to eliminate such double impressions and to provide means for making such adjustments have resulted in expensive and complicated roller printers.

It is, accordingly, the principal object of this invention to provide an improved printer that is of simple and low cost construction, yet is rugged, reliable and accurate, and which produces well aligned printed matter, is easy to maintain, and is adaptable to many different printing applications.

Another object of the invention is to provide a printing device having improved type positioning mechanism for finally aligning and locking printing members after such members have been selectively positioned approximately in combination with an improved roller printer which, while the printing members are locked in their finally aligned positions, presses an element to be printed against the printing members.

Still another object of the invention is to provide type positioning mechanism which cooperates with locating slots or notches in a plurality of printing members and which is able to accurately align the printing members even though such locating slots or notches are of different widths and/or depths as may occur in mass production manufacturing.

A further object is the provision of a roller printer which is adapted to press an element to be printed against printing members on a forward printing stroke during one printing operation and to press another element to be printed against the printing members on a return printing stroke during another printing operation to eliminate the occurrences of double impressions and to enable the roller printer to be made of simplified construction.

A still further object is the provision of a roller printer which is automatically adjustable to accommodate elements to be printed of different thicknesses.

Other objects and advantages will be apparent from the following description in which reference is had to the accompanying drawings.

A preferred form of the improved printer is illustrated in the accompanying drawings.

In the drawings:

Figure I is an elevational view of a weighing scale dial mechanism showing the location of the improved printer as it is mounted on a weighing scale;

Figure II is a fragmentary schematic diagram to illustrate some of the operating principles of a mechanical chart reading device for use in connection with the weighing scale that is illustrated in Figure I to read the graduations of the chart shown in Figure I that moves according to the weight of a load being weighed and to set up the printer for printing the weight indications in digital form;

Figure III is a diametric view of the chart reading device showing a stack of permutation members and the drive mechanism therefor to show their cooperation with each other and with the weighing scale chart;

Figure IV is a horizontal section through the lower portion of the assembly of permutation members which is illustrated in Figure III to show the cooperation between the permutation members and the drive therefor;

Figure V is a plan view of one of the permutation members to show its notch pattern;

Figure VI is a fragmentary plan view of the notched portion of another permutation member to show a second notch pattern;

Figure VII is a front elevational view of the weighing scale chart which is mechanically sensed axially by the permutation chart reading device;

Figure VIII is an enlarged fragment of the graduated portion of the weighing scale chart which is illustrated in Figure VII;

Figure IX is a section at enlarged scale taken substantially along the line IX—IX of Figure VIII to illustrate the shape of the individual chart graduations;

Figure X is a section at enlarged scale taken substantially along the line X—X of Figure VIII to show the shape of locating notches employed to locate the chart prior to taking a reading;

Figure XI is a table showing the permutation code used for each of the graduations of the weighing scale chart;

Figure XII is an exploded view of locating mechanism employed to center the chart graduations prior to taking a reading so as to avoid any possibility of selector pins of the permutation members failing to properly engage the chart graduations;

Figure XIII is a plan view of the locating device;

Figure XIV is a vertical section along the line XIV—XIV of Figure XIII;

Figure XV is a perspective view of the printer with part of its case removed to reveal the printing mechanism;

Figure XVI is a perspective view from another angle of the printer;

Figure XVII is an enlarged elevational view of the end of the printer which may be seen in Figure XVI;

Figure XVIII is a horizontal sectional view taken along the line XVIII—XVIII of Figure XVII;

Figure XIX is a vertical sectional view taken along the line XIX—XIX of Figure XVII;

Figure XX is an enlarged end elevational view of the printer as seen from a position at the left of Figure XV looking toward the printer;

Figure XXI is an enlarged, fragmentary front elevational view as seen from a position in front of Figure I looking toward the printer, the case being removed to reveal the inner mechanism;

Figure XXII is an end elevational view of one of the printing sectors and its cable drive which are illustrated in Figure XXI;

Figure XXIII is a plan view of the cable guide shaft which is shown in Figure XXII;

Figure XXIV is an enlarged sectional view taken along the line XXIV—XXIV of Figure XXIII;

Figure XXV is an enlarged, fragmentary, detailed and more or less schematic view of the printing sector which is illustrated in Figure XXII;

Figure XXVI is an enlarged, fragmentary front elevational view as seen from a position in front of Figure I at a position to the left of Figure XXI looking toward the printer, the printer case being removed and the printer housing being sectioned and broken away to reveal the inner mechanism;

Figure XXVII is an elevational view as seen from a position substantially along the line XXVII—XXVII of Figure XXVI looking in the direction indicated by the arrows;

Figure XXVIII is a plan view of the mechanism which is illustrated in Figure XXVII;

Figure XXIX is a reduced, vertical sectional view of the roller printer mechanism within that part of the printer housing which is shown broken away at the right of Figure XXVI showing the cooperation of the roller printer with the printing sectors which are located above the roller printer;

Figure XXX is an enlarged elevational view of the roller mechanism which is shown in Figure XXIX;

Figure XXXI is a plan view of the mechanism which is shown in Figure XXX; and

Figure XXXII is a perspective view of the printing roller and its resilient mounting.

These specific figures and the accompanying description are intended merely to illustrate the invention and not to limit its scope.

For the purpose of illustration, the improved printer is shown in connection with a mechanical chart reading device that is described in connection with its use in an ordinary dial type weighing scale for reading the graduations of a chart that moves according to the weight of a load being weighed and for setting up the printer for printing weight indications in digital form. It is to be understood that the printer may be operated by any of the usual means for setting up printing members, such as type wheels or sections, or by hand and that it is shown in connection with the mechanical chart reading device for illustrative purposes only. Such a weighing scale comprises a dial housing 1 that contains automatic load counterbalancing and indicating mechanism which may include a chart 2 that is rotated through increments of angle that are proportional to increments of weight applied to the scale. The chart housing 1 is mounted on the top of a scale column 3 of which only the top portion is shown in Figure I.

The mechanical chart reading mechanism is located within the dial housing 1 and is connected to the improved printer which is contained within its housing 5 and case 6 and operated according to the scale readings. The chart 2 has on its face a series of graduations 7 that are visible through a magnifying lens 8 to provide visual indications of the load on the scale. The face of the chart 2 is also provided with molded graduations or indicia 9 consisting of relatively raised and depressed surfaces, as shown in greater detail in Figures VIII, IX and X, contstituting the indicia that are sensed by the reading device.

Figure II shows in schematic form one of each of the essential elements of the reading device while Figure III shows a complete assembly of the sensing and selecting portions of the reading device. Referring first to Figure II, a reading of the chart 2 is taken by first advancing a series of sensing pins 10, one of which is shown, by spring-urged rotation of permutation disks 11 to positions at which they are arrested by engagement of the sensing pins 10 with the indicia 9 of the chart 2. Prior to the engagement of the sensing pins 10 with the indicia 9, a cam 12 forming part of a drive member 13, through engagement with a roller 14, drives a resiliently mounted finger 15 toward the chart until its tip 16 engages a row of raised teeth 17 and comes to rest either between adjacent teeth or on the crest of a tooth. Continued motion of the cam follower 14 turns a rubber tired wheel 18 in a direction tending to move the chart 2 so that the tip of the finger 16, if it had lodged on a crest of a tooth 17, is permitted to enter the space between two of the teeth and thus locate the chart 2. If the tip 16 were already engaged in a space between two of the teeth 17, the wheel slips leaving the chart 2 in position with the corresponding graduation centered in the path of the sensing pins 10. Thus, the pins 10 either enter squarely into the spaces between indicia 9 or onto the crests depending upon the coding of the indicia for that particular graduation.

After the permutation disks 11 are retracted, without disturbing their relative positions as determined by the engagement of the sensing pins 10 with the chart 2, search pawls 20, one for each decade, carried on pawl carriers 21 and each cooperating with four of the permutation disks 11 search notches 22 in the peripheries of the permutation disks 11. As each pawl finds aligned notches in its set of four permutation disks 11 it stops its associated pawl carrier in a position corresponding to the particular graduation of the chart being sensed. The stopped pawl carriers, through their connections through cables 23, position printing sectors in the printer according to the sensed graduation.

The movement of the drive member 13 is produced and controlled by a connecting rod 24 and crank 25 driven by a motor 26 equipped with controls to cause it to drive the crank 25 through one revolution for each start signal.

The sequence of steps in thus taking a reading from the chart 2 is to energize the motor such that it turns the crank 25 and thus oscillates the drive member 13. This oscillation first drives the cam follower 14 and finger 15 toward the chart to locate it with a graduation accurately in line with the sensing pins 10. During the oscillation of the drive member 13 the permutation disks 11, four for each decade, are driven so that their respective pins 10 engage the chart and then are retracted without disturbing their relative positions with respect to each other to a locking position at which they are held while the searching pawls 20, one for each group of four permutation disks or one for each decade, search the peripheries of the permutation disks 11 for the aligned notches. Upon finding the aligned notches the pawls stop the respective pawl carriers 21 in proper indicating positions.

The whole combination or assembly of permutation disks and drive members is shown in greater detail in Figure III. The complete stack up of permutation disks 11 for a four place number includes sixteen of the permutation disks 11, four pawl carriers 21, and enough spacers 27 to separate each of the permutation disks 11 from its neighbor or from a pawl carrier 21 as the case may be. Thus, sixteen permutation disks 11 and four pawl carriers 21 plus an extra spacer at the top of the stack requires a total of twenty-one spacers 27. Each of the spacers is provided with a pair of bifurcated ears 28 and 29 adapted to slip into notches in support rods of a frame with the rods holding the spacers in alignment and in spaced relation. Each of the spacers, on the side facing the chart, also has an inwardly directed notch 30 that terminates in a narrow slot 31 adapted to fit into a corresponding groove cut in an axle 32 on which the permutation disks 11 and pawl carriers 21 are journaled. Thus, each of the spacers 27 has a three point support so as to separate the permutation disks and still allow them to move easily as may be required in sensing the chart or in carrying the pawls 20 along the notched peripheries of the permutation disks 11.

The sensing pins 10 each has a pointed end 33 that is sharp enough to enter the spaces between alternate graduations and yet blunt enough to avoid cutting the chart material and has its other end curled into a circular loop 34 that is a close sliding fit in a hole cut in the connected permutation disk 11 so that the pin moves in the manner of a flat ball and socket joint. This particular construction keeps the thickness of the permutation disk and pin a minimum so that it may fit between closely spaced adjacent spacers 27.

The permutation disks 11 are continually urged in a direction tending to drive the sensing pins 10 against the chart by spring teeth 35 of a comb spring 36 that is carried on a common pawl bail 37. The ends of the spring teeth 35 engage notches 38 in the permutation disks. Movement of the permutation disks 11 under the influence of the springs 35 is limited by a common pawl 40 that is carried in the bail 37 and arranged to selectively engage either of two notches 41 or 42 of each permutation disk 11 and lock it in position when the pawl engages hook-like portions 43 (Figure IV) of the bifurcated ears 29 as the bail 37 is urged counterclockwise, as seen in Figures III and IV, by a return spring 44 attached to its lower end. The common pawl 40 is held seated in pivot notches 45 of the bail 37 by a plurality of small springs 46 forming part of the comb spring 36 and attached to the bail 37. The pawl 40 is urged into engagement with the notches 41 or 42 by a light spring 47 also attached to the bail 37.

In operation, as the drive member 13 is swept clockwise as seen in Figure III or IV it collects the pawl carriers 21 from their previous positions and finally engages an upwardly directed stud 48 carried in an upper arm 49 of the bail 37 so as to drive the bail clockwise through a small distance against the tension of the return spring 44. During the initial movement of the bail 37 it and the permutation disks 11 move as a unit since the disks are held between the spring teeth 35 engaging the notches 38 and the pawl 40 engaging the notches 41 or 42. As the sensing pins 10 engage the chart 2 and drive it against a backup roller 50 the motion of the permutation disks 11 is arrested. The spring teeth 35 yield as the bail 37 continues and the pawl 40 leaves the notches 41 or 42 and slides part way along the smooth periphery of the permutation disks 11 between the notches 41 and 38. This motion is just enough to make sure that the common pawl 40 is out of the notches. On the return motion of the drive member 13, the spring 44 pulls the common pawl bail 37 counterclockwise so that the common pawl 40 may enter the aligned ones of the notches 41 or 42 in each of the permutation disks according to whether the disk had been advanced by its pin finding a low spot in the chart or whether it had been arrested in the first position with the pin on the crest of a graduation. The continued motion with the common pawl 40 engaged in the permuta tion disks drives the disks in retracting motion until the common pawl 40 seats behind the hook-like portions 43 of the spacer ears 29. At this point the motion of the common pawl bail 37 is arrested and the permutation disks 11 are all locked in position.

Continuing motion of the drive member 13 allows the pawl carriers 21 to follow as urged by their drive springs 52, one of which is shown in Figure IV connected to its cable 23. The pawl carriers 21 move until their pawls 20 find aligned notches in a particular combination of permutation disks with which they cooperate. It is to be noted that the position of the aligned notches may vary according to the relative positions of the group of disks cooperating with each pawl.

The sensing pins 10 adjacent the chart 2 are guided in slots 54 of a guide plate 55 that is attached to a frame support 56 that serves as the spacing support for the bifurcated ears 28 of the spacers 27. The slots 54 are just wide enough to admit the pins and, thus, accurately guide them closely adjacent the chart 2. As indicated in Figure IV, the guide plate 55 is adjustable relative to the frame support rod 56 and is controlled by an adjusting screw 57 that works in opposition to the common pawl bail return spring 44.

The return springs 52 are located in the printer, as hereinafter described, and maintain tension on the cables 23 which are run from the selector mechanism into the case 6.

Referring to Figure IV, each cable 23 is passed over an arcuate surface or periphery 58 of its pawl carrier 21 and its end is anchored in a hole 59 drilled through the pawl carrier. The spacers 27 hold the cable 23 from slipping off sideways. The radius of the arcuate surface 58 with respect to the axle 32 on which the pawl carrier is journaled is selected according to the desired travel of the cable 23 for each increment of indication and the spacing of the notches 22 which determine the angular travel of the pawl carrier.

The permutation disks 11 are made with either of two notch patterns and the selector pawls 20 are arranged with one of its teeth advanced two notch spaces ahead of the other tooth. By thus varying the spacing of the pawl teeth and providing the two different patterns for the selector disks it is possible to secure at least eleven different combinations to provide different stopping points for the pawl 20. Figures V and VI show the two notch combinations for the permutation disks 11. In the type shown in Figure V the notched periphery is divided into twenty-three equal spaces with notches appearing in the first, third, fourth, sixth, ninth, tenth, twelfth, fifteenth, seventeenth, eighteenth, twentieth, and twenty-third spaces counting from left to right. Likewise, the permutation pattern shown in Figure VI has notches appearing in the first, second, fifth, sixth, ninth, tenth, thirteenth, fourteenth, seventeenth, nineteenth, twenty-first, and twenty-third spaces. These particular notch combinations used in pairs with the offset pawl teeth operate according to the code set forth in Figure XI. This code is used in determining the location of the raised indicia for each of the graduations on the chart 2 to be sensed.

As shown in Figure VII, the chart 2 is an annular member carried on a spider 60 and having rows of graduations 61 on its marginal area. In order to allow for expansion and contraction of the chart 2 and the spider 60 relative to each other due to temperature changes, the spider 60 is slotted radially at **60*a* to loosely receive a rivet 61*a*, has openings 60*b* which loosely receive rivets 61*b*, and has an aperture 60*c* which fits snugly about rivet 61*c*. The rivets hold the chart 2 and the spider 60 together, the heads of the rivets being sheared off and the bodies of the rivets shown in section in Figure VII for clarity of illustration. The graduations or indicia are preferably molded in the face of the chart in the same manner as phonograph records are made with a plastic or other moldable layer 62 mounted on a metallic backing plate 63 and the graduations being formed in the plastic layer. The arrangement of graduations for a first fragment of the chart is illustrated in Figure VIII. This fragment, starting with the zero indicia of the chart, shows only those graduations in the units or lowest order decade and the row of teeth 17 for locating the chart. The teeth 17 along the marginal area of the chart cooperate with the locating finger 15 and have cross sections as shown in Figure X wherein each of the teeth is shown substantially as a conventional rack tooth. The tip 16 of the locating finger 15 is formed as a mating tooth so as to seat firmly in the spaces between the teeth 17**.

The indicia 9 with which the sensing pins 10 cooperate are of generally similar shape except for being formed of heavier section inasmuch as the locating pins do not have to fit into the spaces between teeth that are located on adjacent graduations. The chart section shown in Figure VIII, as was mentioned, includes that portion starting at the zero graduation which is shown at the right-hand edge. Inasmuch as there are no significant figures to the left of the zero when indicating the zero graduation it is desirable that the printer print a blank at this position. Therefore, the first graduation carries only the single raised portion in the bottom row or D row which, according to the chart shown in Figure XI, gives a blank for the output indication. The permutation disk combination for this graduation causes the aligned notch to appear at the end of the travel of the pawls 20 or at the last possible position at which an aligned notch may be formed. If an error is made such that the pawl does not find the aligned notch it overtravels and the printer indicates such overtravel by printing some distinctive symbol, such as an "E," in place of a digit. The next graduation, a "one," is indicated or denoted by a single raised indicia in the A row; likewise two is indicated by a single indicia in the C row; and the others follow according to the chart. It should be noted that the raised indicia of the chart cause the corresponding permutation disk 11 to be advanced counterclockwise one space as seen in Figure III or IV.

Other chart combinations may be employed besides the particular code indicated. However, this particular code was selected in order that the number of different parts could be reduced. Thus, with the selected code two each of the permutation disks 11, shown in Figures V and VI, may be employed in each decade in combination with the offset pawl 20. If the offset pawl were not employed then each of the four permutation disks cooperating for each decade would have to have its own combination of notches which would make four different parts to be stocked instead of two.

The plastic layer 62 is firmly attached to the metallic backing plate 63 either by molding it in place or by adhesively applying it. The plastic layer is then impressed in a molding operation with the rows of graduations 61. The metallic backing plate 63 has appreciable thickness and the moldable material 62 applied to its surface is of substantially the same thickness. The moldable material must be thick enough to take the full depth of the impressions to be molded therein without having the dies of molds extend through to the metallic supporting member.

Preferably, the plastic layer 62 is molded into form and applied to the backing plate 63 in one operation. Since heavy, rigid molds are required to mold the plastic layer these may be very accurately made so that the molded graduations 61 are precisely located around the chart and so that they are sharply formed, whereby the graduations are especially suitable for accurate sensing by the feeler pins 10.

The composite chart 2 is preferably constructed from hard aluminum alloy so that it is dimensionally stable and able to stand the pressures in the mold. The moldable material may be a soft metal alloy or any of the plastics which will adhesively bond to the aluminum. Ordinarily, a thermoplastic material is employed so that the graduations will be very accurately molded by the application of heat and pressure. Thermoplastic materials are preferred although thermosetting materials may also be used provided that they will adhere to the aluminum or other metal used for the stable support. Suitable materials for coating the mold surface are available to prevent adhesion of the molded layer of the chart to the mold.

The foregoing described construction for the chart 2 permits it to be made at a small cost and with an accuracy that is limited only by the accuracy of the master die that is used to construct the molds. Since this die may be very accurately machined and since there is no loss of accuracy in transferring from the master die to the mold die, it follows that the molded charts are very accurate in dimension and will maintain that dimensional accuracy in use.

Various modifications of construction and substitutions of material in the chart 2 may be made without losing the advantages that are obtained by using a high-strength dimensionally stable material as a backing sheet or support and molded onto a marginal area thereof a layer of moldable material only sufficiently thick to receive the impressions of graduations or indicia to be placed thereon.

The chart locating mechanism is illustrated in greater detail in Figures XII, XIII and XIV. Referring to Figure XII, the cam follower 14 is mounted on the end of a forearm 65 that also carries, as a rigid part thereof, at its elbow end the drive wheel 18 that engages the chart to urge it forward so as to move any tooth 17 falling below the finger tip 16 out of the way and allow the tip 16 of the finger 15 to fall into the space between adjacent teeth 17. The arm 65 is pivotally connected through an elbow joint at the axis of the wheel 18 to a second arm 66 which in turn is pivoted on and, by a spring not shown, is continually urged clockwise about a pin 67 fixed in the framework of the scale. A spring 68 at the joint or elbow at the wheel 18 urges the forearm 65 clockwise with respect to the second arm 66 so that the wheel bears against the chart 2 before the elbow joint starts to turn. The spring urged movement of the forearm 65 relative to the second arm 66 is limited by a down turned ear 69 on the tail end of the forearm 65 that engages the front surface of the lower arm 66. Normally, the spring 68 rotates the forearm 65 to maintain the ear in engagement with the lower arm. However, when the mechanism is pushed toward the chart by the cam pushing on the cam roller 14 the lateral motion of the wheel 18 is arrested and the cam force against the cam follower 14 then rotates the arm 65 around its connection with the lower arm 66 thus producing the relative rotation of the wheel 18.

The finger 15 with its tip 16 is carried on the pin 67 and is urged toward the chart by a spring 70 acting between the lower arm 66 and the finger 15. The forward movement of the finger 15 is limited by a stop 71 erected from the rear portion of the lower arm 66 in position to engage the chart side of the finger 15.

Figure XIV is a section taken through the elbow joint between the arms 65 and 66 and shows a rubber tire 72 mounted on the wheel 18 so as to increase the tractive effort of the wheel on the chart.

In the operation of this mechanism the spring 68 is made stiff enough so that when the wheel 18 engages the chart it pushes the chart back against the backup roller 50 before the spring 68 yields and permits the arm 65 to turn relative to the arm 66. This insures that sufficient force is exerted against the chart to cause it to move even though the tip 16 of the finger 15 should be partially caught on the corner of the crest of a tooth. It is necessary that sufficient force be exerted at this time so that the tip of the finger 15 will slide across the crest of a tooth 17 and firmly engage in the valley against the side of the next tooth 17.

Referring to Figures XV and XVI, the cables 23, one for each decade in a four place number, are led through ordinary Bowden cable casings 73 that are attached by means of adjustment clips 74 to a stationary support 75 within the dial housing 1 and that run through an opening 76 in the dial housing 1 into the printer case 6. The ends of the cables 23, as hereinbefore described in connection with the more or less schematic illustration of one of the return springs 52 shown in Figure IV, are connected to the return springs 52 that actually are located in the printer as illustrated in Figures XX and XXI. The printer is driven by means of a horizontal shaft 77 which is driven in turn by the motor 26 (Figure II), the operative connection between the shaft 77 and the motor 26 not being shown; however, it is to be understood that every time the motor 26 drives the crank 25 through one revolution in response to a start signal it also turns the shaft 77 through one revolution. The shaft 77 extends from the dial housing 1 into the printer case 6 to drive the mechanism therein and also carries a miter gear 78 which meshes with a cooperating miter gear 79 that is attached to a vertical shaft 80 (Figure XXVI) which drives that part of the printer mechanism (roller printer) contained within the printer housing 5. Every time that the horizontal shaft 77 is turned through one revolution it drives the vertical shaft 80 through one revolution.

The mechanism within the printer case 6 is driven by means of cams 81 and 82 (Figures XVII and XVIII) fixed to the shaft 77, the shaft 77 being journaled within the dial housing 1 in the support 75 (Figure XVI), within the printer case 6 in a vertical end frame 83 (Figures XVII and XVIII) and intermediate its ends in a supporting member 84 (Figure XXVI). Horizontal, sleeve-like spacers 85, two of which are shown in Figure XV, space the vertical end frame 83 from the dial housing 1, bolts 86 which extend through openings 87 in the end frame 83 and through the sleeve-like spacers 85 functioning to attach the end frame to the dial housing.

The cam 81 functions to reciprocate a cam follower plate 88, as indicated by the double-ended arrow in Figure XVII, that drives an inked ribbon reverse mechanism and a record strip mechanism. The cam follower plate 88 is connected to a slidable bar 89 by means of a toggle mechanism 90 which comprises a bracket 91 fixed to the slidable bar 89, an arm 92 pivotally mounted on a bracket 91 by means of a pivot pin 93, and a bowed spring 94 the ends of which engage in opposed V-notches in the bracket 91 and in the arm 92. An upwardly extending portion of the arm 92 is movable within limits defined by the ends of a notched-out portion 95 (Figure XVIII) of the bar 89, the bar 89 being slidable in the slotted arms 96 of a bracket 97 which is attached to the end frame 83 by means of screws 98. The bracket 97 also functions to support a shoulder screw 99 which cooperates with a horizontal slot 100 in the cam follower plate 88, the reciprocable plate 88 being slidable on the shoulder of the screw 99 and being pivotally attached on the upper end of the arm 92 of the toggle mechanism 90 by means of a pivot pin 101.

The end frame 83 has mounted therefrom a pair of shafts 102 and 103 (Figure XVII) on which is fixed a pair of ribbon spools 104 and 105 (Figures XV, XVI and XX), respectively. Adapted to be wound and unwound alternately on the spools 104 and 105 is an inked ribbon 106 which is moved back and forth through a printing station as indicated by the double-ended arrows in Figure XX. Pinned to the shafts 102 and 103, respectively, is a pair of ratchet wheels 107 and 108 the teeth of which are arranged so that they are driven in opposite directions. Reciprocation of the cam follower plate 88 to the right as viewed in Figure XVII causes a pawl 109 (Figure XVIII) that is carried by an end of the slidable bar 89 and that extends through an opening 110 in the end frame 83 to cooperate with and drive the ratchet wheel 108 which rotates its spool 105 slightly so as to advance the ribbon 106. The slidable bar 89 and the toggle mechanism 90 are driven through a definite prescribed stroke which is less than the total range of travel of the slidable bar 89. When the toggle mechanism 90 is operated, the stroke of the slidable bar 89 is shifted from one end of its range of travel to the other. With the arm 92 of the toggle mechanism 90 at the left end of the notched-out portion 95, as shown in Figures XVII and XVIII, the slidable bar 89 and the toggle mechanism 90 are reciprocable in a stroke so that the pawl 109 drives the ratchet wheel 108 counterclockwise as viewed in Figure XVII and so that a pawl 111 that is carried by the other end of the bar 89 and that extends through an opening 112 in the end frame 83 is reciprocable in an area where it does not cooperate with and drive its ratchet wheel 107, the spool 104 carried by the shaft 102 acting as a supply roll for the ribbon 106 as the ribbon is wound upon the spool 105.

The bowed spring 94 acts as a compression link between the bracket 91 and the arm 92 of the toggle mechanism. The force exerted by the spring 94 tending to keep the arm 92 against one end or the other of the notched-out portion 95 is slightly greater than the force required to drive the spool on which the ribbon 106 is being wound. During operation, the spring force can be overcome when the pawl doing the driving can no longer rotate its ratchet wheel, such as when the ribbon 106 tightens as it reaches its end on the supply roll. When the tension in the ribbon 106 increases to a certain point because the ribbon has reached its end, the pawl driving the ratchet wheel of the take-up spool prevents the slidable bar 89 from reciprocating. The reciprocating cam follower plate 88 continues to move, however, and in so doing actuates the toggle mechanism 90 to shift the stroke of the slidable bar 89 to wind the ribbon 106 on what formerly was the supply spool. When the toggle mechanism shifts to the right end of the notched-out part 95, as viewed in Figures XVII and XVIII, to shift the stroke of the slidable bar 89 from one end of its range of travel to the other. The slidable bar 89 and the toggle mechanism 90 then are reciprocable in a position so that the pawl 111 drives the ratchet wheel 107 clockwise as viewed in Figure XVII and so that the pawl 109 is reciprocable in an area where it does not cooperate with and drive its ratchet wheel 108, the spool 105 carried by the shaft 103 acting as a supply roll for the ribbon 106 as the ribbon is wound upon the spool 104. Hence, the inked ribbon 106 automatically is wound and unwound alternately on the spools 104 and 105 by the ribbon reverse mechanism.

Fixed respectively to the ratchet wheels 107 and 108 is a pair of grooved hubs 113 and 114 (Figure XX) each of which receives a spring 115 which acts as a friction brake. The springs 115 are looped around the hubs 113 and 114 and have their opposite ends stationarily attached at 116 to the end frame 83. The springs 115 maintain the inked ribbon 106 under proper tension to present it to the printing station without too much slack and prevent the driven one of the spools 104 and 105 from backing up during the return stroke of the bar 89.

While the cam follower plate 88 is driving the inked ribbon 106 one way or the other, the plate 88 also drives the record strip mechanism in the direction indicated by the single-ended arrows in Figure XX. The record strip mechanism includes a pair of shafts 117 and 118 (Figure XVII), a paper supply spool 119 (Figure XX) rotatably journaled on shaft 117 and a paper take-up spool 120 (Figures XV and XVI) fixed to turn as one with shaft 118, a translucent record strip 121 being drawn from the supply spool 119 and being wound upon the driven take-up spool 120. A friction brake spring 122, which is like the springs 115, cooperates with a grooved hub 123 on the spool 119 and functions to maintain the record strip 121 under proper tension.

The driven paper take-up spool 120 is turned by a drive which includes the reciprocable cam follower plate 88, a rockable plate 124 which is pivotable about the axis of a rotatable shaft 125 (Figure XIX) and which is connected to the cam follower plate 88 by means of a stud 126 that engages a vertical slot 127 in the cam follower plate 88 (Figure XVII), and a driving pawl 128 which is attached to the rockable plate 124. Horizontal reciprocation of the cam follower plate 88 rocks the plate 124 about the axis of the shaft 125. Clockwise rocking of the plate 124, as viewed in Figure XVII, causes the driving pawl 128 to turn a ratchet wheel 129 clockwise, the wheel 129 being fixed to the shaft 125 which is journaled in the end frame 83. The teeth on the ratchet wheel 129 are arranged so that the wheel is driven in the one direction only, an anti-backup pawl 130, which is urged in a clockwise direction by a spring 131 connected between the end frame 83 and the pawl 130, preventing counterclockwise rotation of the ratchet wheel 129 as viewed in Figure XVII.

The ratchet wheel 129 which is fixed to the shaft 125 turns the shaft and a rubber pinch roll 132 attached to the shaft counterclockwise as viewed in Figure XX. A second rubber pinch roll 133, in spring-urged contact with the first pinch roll 132, is carried by a bracket 134 on a shaft 135 that is held in place on the end frame 83 by a nut 136. The pair of rubber pinch rolls 132 and 133 is gear connected by means of a pair of spur gears 137 one fixed to the shaft 125 and one fixed to a shaft 138 on which the second rubber pinch roll 133 is mounted, the shaft 138 being journaled in the bracket 134. The pair of spur gears insures that the pinch rolls 132 and 133 move together, the first roll 132 turning counterclockwise and the second roll 133 turning clockwise as viewed in Figure XX.

The pinch roll 133 is spring-urged into contact with the drive roll 132 to pinch the record strip 121 therebetween. The drive roll 132 is carried on the ratchet driven shaft 125 so that it turns a fixed amount for each printing operation thus spacing printed impressions uniformly along the length of the strip. The take-up spool 120, however, is driven by a belt 139 (preferably a spring belt) which stretches and slips to maintain a generally constant tension on the record strip 121 as it winds on the spool 120. The belt 139 connects a groove 140 (Figure XIX) in a hub 141 that turns as one with the ratchet driven shaft 125 to a groove 142 (Figure XV) in the paper take-up shaft 118.

The free ends of the inked ribbon shafts 102 and 103 and of the record strip shafts 117 and 118 are journaled in eccentric bearings 143 (Figure XXI) which are adjustably attached to a removable end plate 144 (Figures XV, XVI, XX and XXI) by means of nuts 145. The end plate 144 is removably mounted on the ends of a pair of horizontal spacer posts 146, that are fixed at 147 (Figure XXI) to the end frame 83, by means of a pair of spring urged-apart clamps 148 which are slidably mounted on the end plate 144 by means of shoulder screws 149. The plate 144 is removed by pinching ears 150 on the clamps 148 together so that the ends of the clamps 148 are withdrawn from grooves 151, one of which is shown in Figure XXI, in the ends of the horizontal posts 146 to obtain access to the interior of the printer. Parallelism of the inked ribbon shafts 102 and 103 and of the record strip shafts 117 and 118 is adjusted by loosening the nuts 145 and by pivoting the bearings 143. A knurled knob 152 fixed to the pinch roll shaft 138 functions as a means for advancing the record strip 121 manually. The knob 152 has been removed from its shaft 138 as viewed in Figure XX for clarity of illustration; however, it can be seen in Figure XV extending through a hole 153 in the end plate 144.

The inked ribbon 106 is guided around the outer surface of a curved sheet metal strip 154, as illustrated in Figures XV, XVI and XX, which is attached at 155 (Figure XXI) to the end frame 83. A second curved sheet metal strip 156 which is in very slightly spaced relationship with the first strip 154 also is attached at 155 to the end frame 83 and functions to guide the record strip 121, the strip 121 being moved between the spaced guide members. The pair of guide strips 154 and 156 are provided with openings which define a printing station 157 (Figure XXI).

Each of the cables 23, after being led through its cable casing 73 into the printer case 6, is run down around a circular groove 158 (Figure XXII) in a hub 159 on a printing sector 160 and back up to its return spring 52 which is hooked on a horizontal threaded rod 161 that is fixed to the end frame 83. The bottoms of the sectors 160 are located just above the guide strip 156 in juxtaposition with the record strip 121 in the printing station 157. A ferrule 162 on each of the cables 23 is flattened and a pin 163 through the ferrule fixedly attaches the cable 23 to its printing sector 160. The four printing sectors 160, one for each decade in a four place number, each is provided with a press-fitted bearing 164 and are rotatably mounted on a stationary sector shaft 165 extending horizontally from the end frame 83. Spacers 166 (Figure XXI) on the sector shaft 165 keep the printing sectors 160 slightly apart. Since one end of each of the cables 23 is anchored in its hole 59 (Figure IV) in its pawl carrier 21 and since each of the cables 23 also is anchored to its printing sector 160 at a point intermediate such pawl carrier and its return spring 52, the printing sectors 160 move according to the corresponding pawl carriers 21.

Printing type 167 (Figures XXV) are formed on the peripheries of the sectors 160 (for example, by engraving) in positions which are indicated in Figure XXV and which correspond to the table (Figure XI) showing the permutation code used for each of the graduations of the weighing scale chart. Hence, the printing sectors 160 are set up by the pawl carriers 21 according to the sensed graduation. As each pawl 20 finds aligned notches in its set of four permutation disks 11 it stops its pawl carrier 21 in a position corresponding to the particular graduation of the chart being sensed. The stopped pawl carriers, through their connections through the cables 23, position the printing sectors 160 in the printer according to the sensed graduations, e.g., if one of the pawl carriers 21 stops at a position which gives an output indication of "one," its operatively attached printing sector 160 is set up so that the type 167 on the sector is in position to print a "one" in the printing station 157. Inasmuch as there are no significant figures to the left of the zero when indicating the zero graduation the printer prints a blank, indicated by "B" in Figure XXV and by "Blank" in Figure XI, at this position. If an error is made such that a pawl does not find an aligned notch it overtravels and the printer indicates such overtravel by printing "E" as indicated in Figure XXV.

The positions of the printing type 167 in the printing station 157 can be adjusted by a trial and error adjustment provided by the clips 74 (Figures XVI and XXII). One end of each of the cable casings 73 is attached by means of a clip 74 to the support 75 within the dial housing 1 and the other end of each of the cable casings 73 is butted against the bottom of one of a series of holes 168 in a cable guide shaft 169 which is attached by means of a nut 170 threaded on one of its ends to the end frame 83. As illustrated in detail in Figures XXIII and XXIV, each of the holes 168 communicates with a slot 171 in the cable guide shaft 169. The bottoms of the holes 168 support the ends of the cable casings 73 and the slots 171 allow the cables 23 to continue on through the guide shaft 169. More holes 168 and slots 171 are provided than is necessary for the four sets of cables and casings so that additional cables and casings can be added and so that there are sets of holes and slots conveniently located for all possible positions of the cables and casings.

The cable casings 73 extend through the opening 76 in the dial housing 1 into the printer case 6 in bends or loops 172 (Figures XV and XXII) the radii of which can be changed by loosening the adjustment clips 74 and shifting the ends of the cable casings 73 at the clips one way or the other. Such shifting does not change the positions of the other ends of the cable casings 73 which are stationary in the bottoms of the holes 168 in the cable guide shaft 169. The changing of the radii of the loops 172 in the cable casings changes the lengths of the paths in which the cables 23 travel from the pawl carriers 21 to the printing sectors 160. Since only the lengths of the paths are changed and not the lengths of the cables 23, such adjustment of the radii of the loops 172 in the cable casings 73 cause the cables 23 either to pivot the printing sectors 160 or allow the return springs 52 to pivot the printing sector to selectively adjusted positions.

It is not practical to attempt to have the printing sectors 160 positioned exactly by the pawl carriers 21 because of the usual manufacturing tolerances necessary in mass production of the chart reading mechanism and of the printer. Therefore, the printing sectors 160 are pivoted clockwise, as viewed in Figure XXII, about the axis of the sector shaft 165 by the cables 23 which are operated by the chart reading device only to approximate printing positions. Clockwise pivoting of the printing sectors 160 extends the return springs 52. Final positioning of the printing sectors 160, i.e. accurate aligning for the printing operation, is accomplished by means of a single centering and locking detent bar 173 that is carried horizontally between a pair of detent actuating links 174 and that is received in locating slots 175 in the printing sectors 160 to pivot the printing sectors 160 clockwise additionally into accurately aligned relationship with each other so that the printed matter appears in a straight line. After finally aligning the printing sectors 160, the detent bar 173 locks the sectors so that they do not move during the printing operation.

The detent actuating links 174 are each slidable in a grooved bushing 176 (Figure XXI) on the stationary sector shaft 165, slots 177 (Figure XX) in the links 174 being received in the grooves in the bushings. The detent bar 173 is carried between the links 174 near the bottoms of the links, the upper ends of the links 174 each being pivotally connected to a short arm 178 at 179 each of which arms is clamped, by means of bolt 180 and nut 181, to a shaft 182 that is mounted for rotation between the end frame 83 and the removable plate 144. The shaft 182 is driven by a long arm 183 (Figure XVII) that is keyed to the shaft 182 at its upper end and that carries a cam following roller 184 at its lower end, the roller 184 constantly being urged into contact with the periphery of the cam 82 by means of a spring 185 interconnecting the lower part of the long arm 183 and a stationary bracket 186 that is attached by means of screws 187 to the end frame 83.

While the chart reading device is setting up the printing sectors 160, the cam following roller 184 is on a high part 188 of the cam 82 as illustrated in Figure XVII. Movement of the roller 184 onto the high part 188 of the cam 82 pivots the shaft 182, operatively connected to the roller by means of the long arm 183, clockwise to lift the pair of detent actuating links 174 into their positions indicated in Figure XVII. In such position of the long arm 183, the detent bar 173 is lifted out of the locating slots 175 by the links 174 so that the printing sectors 160 are freely movable by the cables 23. Movement of the roller 184 onto the low part 189 of the cam 82 permits the spring 185 to draw the long arm 183 against a resilient stop 190 mounted on the bracket 186. In such position of the long arm 183, the detent actuating links 174 are lowered and the detent bar 173 is received in locating slots 175 of the printing sectors 160 as illustrated in Figure XX to finally align and lock the printing sectors 160 prior to the roller printing operation.

Referring to Figures XXII and XXV, the printing type 167 are located on the peripheries of the printing sectors 160 relative to radial index sides 191 of the locating slots 175. Broken lines 192 (Figure XXV) indicate that each of the index sides 191 coincides with the centerline of the printing type or character 167 associated therewith. Adjacent each of the index sides 191 of the slots 175 are detent bar guiding surfaces 193 on the sectors 160 which surfaces direct a chamfered surface 194 on the detent bar 173 into an approximately aligned row of locating slots 175 when the detent actuating links 174 are lowered. The detent bar 173 drives all of the printing sectors 160 clockwise very small distances which distances may vary from sector to sector according to the distance each particular sector is spaced, after being approximately positioned selectively by a cable 23, from the final printing location. In any event, all of the printing sectors 160 are approximately positioned selectively by the cables 23 to extend the return springs 52 and then all of the printing sectors 160 are finally positioned by the detent bar 173 to extend the return springs 52 small increments further. After finally being positioned, the return springs 52 urge the index sides 191 of the aligned row of locating slots 175 into contact with driving surface 195 of the detent bar. Hence, the aligned row of index sides 191 is held in locked position against the driving surface 195 of the detent bar 173 so that the sectors 160 cannot move during the roller printing operation.

Heretofore, type positioning mechanism which included a driven member upon which was mounted a single centering bar for use in aligning locating notches on printing members has not been satisfactory because the centering bar fitted closely in the locating notches and when the notches were of different sizes and depths and/or the axes of rotation of the printing members and of the driven member were not parallel it was impossible for the single centering bar to align the printing members so that they would print in a straight line. The improved type positioning mechanism which includes the single detent bar 173, however, accurately aligns the printing sectors 160 even though the locating slots 175 are of various widths and/or depths as manufactured by mass production methods. This is accomplished by locating the printing type 167 relative to the index sides 191 of the locating slots 175 and by having the driving surface 195 of the detent bar 173 cooperate with such index sides and rotate the sectors 160 to extend the return springs 52 so that, as finally positioned, the aligned row of index sides 191 is held in locked position by the springs against the driving surface 195 of the detent bar as hereinbefore described. Hence, the improved type positioning mechanism can accommodate locating slots 175 of various widths and/or depths. As illustrated in Figure XXII, the detent bar 173 is in its lowermost position; in such position, spaces 196 always are located between the lower end of the detent bar 173 and the bottoms of the aligned row of locating slots 175 and spaces 197 may be located between the side of the detent bar 173 which is opposite to the bar's driving surface 195 and the sides of the aligned row of locating slots 175.

Referring to Figures XX and XXI, the bushing 176 for the left hand detent actuating link 174 is spaced from the end frame 83 by means of a spacer 198 on the sector shaft 165 which spacer extends through a stationary strut 199 that is fixed on the cable guide shaft 169 and that functions to take part of the thrust applied by a roller printer which is hereinafter described and which is contained within the printer housing 5. A pair of spacers 200 separates such bushing 176 from the adjacent one of the printing sectors 160 which as hereinbefore described are separated from each other by spacers 166. The left hand one of the spacers 166 can be omitted and a punctuation plate substituted in its place. Such a punctuation plate is not shown for clarity of illustration but it may be like the stationary strut 199 except that on its lower end it carries a printing character which prints an appropriately placed comma in the four place printed number. The punctuation plate also may be used to print appropriately placed decimal points in some applications.

An additional spacer 201 separates a second stationary strut 202 from the right hand one of the printing sectors 160. The strut 202 can be seen in solid lines in Figure XX; it is fixed on the cable guide shaft 169, like the first strut 199, has a hole through which the stationary sector shaft 165 passes, has a large clearance hole 203 (Figure XXI) to allow for movement of the detent bar 173, and has the same function as the strut 199, i.e., to take part of the thrust imparted by the roller printer. In addition, the second strut 202 functions to print "LB." by means of type 204 fixed to its lower end. The right hand one of the bushings 176 is separated from the strut 202 by means of a spacer 205 and the entire stack of elements on the sector shaft 165 is held in place by means of a collar 206 on the sector shaft.

While the detent bar 173 is received in the locating slots 175 of the printing sectors 160 as illustrated in Figure XX to finally align and lock the sectors, roller printer mechanism (Figures XXVI–XXXII) contained within the printer housing 5 completes the printing operation. A ticket or other element 207 (Figures I, XV and XVI) is placed in a narrow opening 208 between the bottom of the printer case 6 and the top of a table 209 which supports the ticket to receive an imprint in juxtaposition with the printing type 167 and 204 in the printing station 157. It is to be understood that while the element to receive the imprint is shown as being a ticket, the present invention easily may be adapted to print on other elements.

As hereinbefore described, every time that the horizontal shaft 77 is turned through one revolution it drives the vertical shaft 80 to which it is gear connected through one revolution, the shaft 80 being journaled in the supporting member 84 that is attached by means of a bolt and nut connection through an opening 210 in the member 84 to suitable framework within the dial housing 1. If that part of the printer case 6 next to the dial housing 1 as viewed in Figure I were removed, the supporting member 84 as seen in Figure XXVI would be exposed. The lower part of the member 84 is carried by an extension 211 of the scale column 3 and is fixed thereto by means of screws 212 one of which can be seen in Figure XXVI. The extension 211 is covered by the printer housing 5 and the table 209.

Clockwise rotation of the shaft 80 as indicated by the left hand arrow in Figure XXVIII rotates a Geneva drive cam 213 and a power storage cam 214 fixed thereto. As illustrated in Figure XXVIII, prior to engagement of a driver 215, which rotates as one with the cam 213, with one of the slots 216 in a Geneva driven member 217, a rise 218 on the power storage cam 214 pushes back a cam follower roller 219 carried by a cam follower 220 pivoted at 221 to the member 84 so that the cam follower is pivoted counterclockwise. This extends a spring 222 (Figure XXVI) which interconnects a coil anchor pin 223 carried on the free end of the cam follower 220 and a stationary stud 224 carried by the extension 211 to store power in the spring 222 during a time that the motor 26 is lightly loaded. When the driver 215 is received in a slot 216 in the Geneva driven member 217 to drive the roller printer mechanism, the cam follower roller 219 is urged toward a low spot 225 on the power storage cam 214 and assists in turning the cam and the shaft 80 to which the cam 214 is fixed clockwise to return the stored power to the system and thus to assist the motor 26 in driving the roller printer mechanism.

The Geneva driven member 217 is fixed on a vertical shaft 226 the upper end of which is journaled in the supporting member 84 and the lower end of which is journaled in the extension 211 of the scale column 3. One clockwise revolution of the shaft 80 as viewed in Figure XXVIII causes one-quarter of a counterclockwise revolution of the shaft 226, the driver 215 being received in one of four slots 216 in the Geneva driven member 217 during part of each revolution of the shaft 80. A spur gear 227 also is fixed to the shaft 226 and it meshes with a pinion 228 that is fixed on the upper end of a shaft 229 which also is journaled in the extension 211 and which turns a driving sprocket 230 fixed to the lower end of the shaft. A continuous chain 231 runs around the driving sprocket 230 and around an idler sprocket 232 that is attached to a vertical shaft 233 which is journaled in an ear 234 on the extension 211. The gear ratio between the shaft 226 to which the Geneva driven member 217 is fixed and the shaft 229 to which the pinion 228 is fixed is such that one-quarter of a turn of shaft 226 takes the chain 231 from "X" to "Y" (Figure XXVI), i.e., one-half revolution of the continuous chain 231.

Referring to Figures XXIX–XXXII, Figure XXIX may be considered as an extension at a reduced scale of Figure XXVI, the point "Y" at the end of the chain 231 being shown in both of the figures. Bosses 235 on the extension 211 of the scale column 3 adjustably support, by means of adjustment screws 236, a carriage track 237 having a depression 238 in its upper surface near each of its ends. Mounted for reciprocation on the track 237 is a carriage 239 having a U-shaped frame 240 which carries four flanged rollers 241 that are so located two above and two below the track 237 with their flanges embracing the marginal area of the track that the carriage follows the track closely as it is reciprocated by a link 242 pivotally connected by means of a pivot pin 243 to the carriage 239 and pivotally connected by means of a pivot pin 244 to the chain 231. The pivot pins 243 and 244 are riveted tightly to the carriage 239 and to the chain 231, respectively. Movement of the chain 231 from "X" to "Y" pushes or pulls the carriage 239 from one depression 238 in the track 237 to the other, the marginal area on the track 237 being spaced far enough from the depressions 238 that the flanges on the rollers 241 never move into a depression.

Vertical slots 245 in the frame 240 receive a pair of platen roller shafts 246 upon which are mounted a lower roller 247, an upper printing roller 248, and a U-shaped inner frame 249 having a pair of upper vertical slots 250 which receive the upper one of the roller shafts 246 and a pair of lower openings 251 which receive in a close fit the lower one of the roller shafts 246. A pair of roller pressure springs 252 urges the roller shafts 246 apart.

In the operation of the roller printer, movement of the continuous chain 231 from "X" to "Y" causes movement of the carriage 239 operatively connected to the chain toward the left as viewed in Figure XXIX. The U-shaped frame 240 cannot move up or down relative to the track 237; however, since the ends of the roller shafts 246 are received in vertical slots 245 in the frame 240, the lower roller 247 is free to move out of the right hand one of the depressions 238 onto the upper surface of the track 237 while the roller shafts 246 move upwardly in the vertical slots 245. Movement of the lower roller 247 out of the depression 238 causes the inner frame 249 to be lifted positively because of the close fit of the lower roller shaft 246 in the openings 251 in the inner frame 249. Upward movement of the inner frame 249 causes the printing roller 248 also to move upward, since the roller shafts 246 are urged apart by the roller pressure springs 252, so that although the upper roller shaft 246 is received in the vertical slot 250 in the inner frame 249 it nevertheless moves with the inner frame at the start of the printing cycle.

Upward movement of the printing roller 248 caused by the lower roller 247 moving out of the depression 238 thrusts the printing roller 248 out of a slot 253 in the table 209, the length of the slot 253 being shown in Figure XXIX and its width indicated in Figure XXXI by broken lines. The printing roller 248, before it reaches the printing type 167 and 204, is carried at an elevation such that its upper face is above the face of the printing type, such elevation being determined and adjusted by means of the adjustment screws 236 which are so set that there is a uniform pressure of the printing roller 248 along the face of the type. As indicated in Figure XXXI, the printing roller 248 has a sloppy fit in the table slot 253 and is guided along the face of the type by the table slot which serves as an index for the printing mechanism, the mechanism within the case 6 being aligned during assembly relative to the table slot.

When the printing roller 248 reaches the printing station 157, the type 167 and 204 force the roller downward in the slots 245 and 250 in the frames 240 and 249, respectively, in opposition to the roller pressure springs 252. In such position, the printing roller 248 presses the ticket 207 against the inked ribbon 106 (Figure XX), the inked ribbon against the translucent record strip 121, and the record strip against the face of the type. Since the inked ribbon is pinched between the ticket 207 and the translucent record strip 121, an inked imprint is made on the ticket and a similar inked imprint is made on the continuous strip for record purposes, the imprint on the ticket being read directly while the imprint on the record strip is read through the translucent strip from the back or unprinted side of the strip.

The resilient mounting of the printing roller 248 in the slots 245 and 250 produces an automatically adjustable roller printer to accommodate elements to be printed of different thicknesses, and the mounting of the printing roller 248 in the inner frame 249, which must move up and down with the lower roller 247, causes the printing roller 248 to drop below the table 209 when the lower roller 247 drops into one of the depressions 238 in the carriage track 237 to permit elements to be printed to be slid into the opening 208 between the printer case 6 and the table 209 and into the printing station.

Continued movement of the chain 231 from "X" to "Y" causes continued movement of the carriage 239 operatively connected to the chain until the lower roller 247 drops into the left hand one of the depressions 238 in the track 237. This completes the printing cycle. The roller printing cycle for the next printing operation is repeated similarly except that movement of the chain 231 from "X" to "Y" causes movement of the carriage 239 toward the right as viewed in Figure XXIX. Heretofore, many roller printers have been driven both on a forward printing stroke and on a return stroke for each printing operation which often caused double impressions of the printing type. Attempts to eliminate such double impressions in double stroke roller printers has led to expensive and complicated roller printers. The printer embodying the present invention is adapted to press an element to be printed against the printing members on a forward printing stroke during one printing operation and to press another element to be printed against the printing members on a return stroke during another printing operation to eliminate the occurrences of double impressions and to enable the roller printer to be made of simplified construction.

In the overall operation of the printer, every time that the motor 26 (Figure II) drives the crank 25 through one revolution in response to a start signal it also turns the shaft 77 through one revolution. Every time that the horizontal shaft 77 is turned through one revolution it drives the vertical shaft 80 through one revolution and also turns the cams 81 and 82 counterclockwise as viewed in Figure XVII through one revolution. As soon as the motor 26 starts, the chart reading mechanism which is located within the dial housing 1 makes a reading of the chart 2 and sets up, by means of the cables 23, the printing sectors 160 according to the scale reading, the detent bar 173 being lifted out of the locating slots 175 by the links 174 so that the printing sectors 160 are freely movable by means of the cables 23 while the reading of the chart takes place. While the chart reading device is setting up the printing sectors 160, the cam following roller 184 is on the high part 188 of the cam 82 as illustrated in Figure XVII.

After the chart reading device completes its work by moving all of the printing sectors 160 fully over, i.e., away from "E" (error) toward "9" and beyond and then allowing them to return each to its own selected digit position (less a small increment to insure accurate final positioning by the detent bar 173), during which time the inked ribbon and record strip cam 81 is returning the ratchet wheels 108 and 129 "free," the cam following roller 184 moves immediately from its position shown in Figure XVII down onto the low part 189 of the cam 82 permitting the spring 185 to draw the long arm 183 against the resilient stop 190 to lower the detent actuating links 174 so that the detent bar 173 is received in the locating slots 175 of the printing sectors 160 to finally align and lock the printing sectors prior to the roller printing operation.

As illustrated in Figure XVII, as soon as the cam following roller 184 moves down onto the low part 189 of the cam 82, the inked ribbon and record strip cam 81 starts idling through a "backlash" or "free" zone wherein no contact is made with the cam follower plate 88. While the cam following roller 184 moves along the periphery of the low part 189 of the cam 82, during which time the inked ribbon and record strip cam 81 moves through the "backlash" zone, the printing sectors 160 are finally aligned and locked and no movement of the inked ribbon 106 or the record strip 121 occurs and the printing roller 248 travels across the face of the printing type.

As soon as the printing roller 248 completes its one-stroke travel, the cam following roller 184 returns to the high part 188 of the cam 82 to unlock the printing sectors 160 and the reciprocable cam follower plate 88 is so moved by the cam 81 that the ratchet wheels drive the inked ribbon and record strip to advance them. The cycle now is complete, the printing sectors 160 again being free to be set up by the cables 23 and fresh portions of the inked ribbon and record strip being advanced into the printing station. When the chart reading device again makes a reading of the chart, the inked ribbon and the record strip already are positioned in the printing station and the inked ribbon and record strip cam 81 returns the ribbon ratchet wheels and the record strip ratchet wheel free while the chart reading takes place.

In lieu of the roller printer, any means, such as a printer of the hammer type, may be used to press an element to be printed against the printing characters while the printing members are finally aligned.

The embodiment of the invention described in connection with the drawings is to be regarded as illustrative only since the invention is susceptible to variation, modification and change within the spirit and scope of the appended claims.

Having described the invention, we claim:

1. In a printer, in combination, a plurality of rotatably mounted printing members which are adapted to be selectively positioned approximately in a printing station and each of which has a series of locating slots having index sides and each of which has a series of printing type positioned with respect to the index sides of the locating slots, final type positioning means comprising a centering bar having a driving face which is received in an approximately aligned row of locating slots with a loose fit in at least one of the slots and means for urging the index sides in such row of locating slots against the driving face of the bar to take up any such looseness of the fit, whereby the locating slots may be of various widths and depths without affecting accurate alignment of the printing type, means for supporting an element to receive an imprint in juxtaposition with the printing type, and a roller printer which is adapted to press the element against the printing type while the printing members are aligned by the final type positioning means.

2. A printer according to claim 1 wherein the centering bar is located between the axis of rotation of the printing members and the locating slots.

3. In a printer, in combination, a plurality of rotatably mounted printing members, springs urging the printing members in a first direction, the printing members being adapted to be selectively positioned in a second direction approximately in opposition to the springs, a series of slots having index surfaces and a series of printing type positioned with respect to the index surfaces on each of the printing members, final type positioning means having a driving face of a size to fit loosely in the slots, means for moving the driving face cyclically whereby the driving face is moved into cooperative relationship with an approximately aligned row of index surfaces on the printing members to move the printing members in said second direction further in opposition to the springs to take up any such looseness of the fit and to accurately align the printing members during a printing operation, means for supporting an element to receive an imprint in juxtaposition with the printing type, and a roller printer which is adapted to press the element against the printing type while the printing members are aligned by the final type positioning means.

4. In a printer, in combination, a plurality of rotatably mounted printing members which are adapted to be selectively positioned approximately in a printing station and each of which has a series of locating slots and a series of printing type positioned with respect to the locating slots, final type positioning means including a centering bar which is received in a loose fit in an approximately aligned row of locating slots and means for urging corresponding sides in such row of locating slots against the centering bar to take up any such looseness of the fit, whereby the locating slots may be of various widths and depths without affecting accurate alignment of the printing type, and a roller printer which is adapted to press an element to be printed against the printing type while the printing members are aligned by the final type positioning means.

5. A printer according to claim 4 wherein guiding surfaces are located on the printing members one adjacent each of the locating slots and the centering bar has a chamfered end which is guided by the guiding surfaces on the printing members into said approximately aligned row of locating slots.

6. In a printer, in combination, a plurality of rotatably mounted printing members which are adapted to be selectively positioned approximately in a printing station and each of which has a series of locating slots and a series of printing type positioned with respect to the locating slots, final type positioning means comprising a centering bar having a width which is substantially less than the width of any one of the locating slots and which partly is received in a loose fit in an approximately aligned row of locating slots and means for urging corresponding sides in such row of locating slots against the centering bar to take up any such looseness of the fit, whereby even though the locating slots are of various widths and depths accurate alignment of the printing members is effected, means for supporting an element to receive an imprint in juxtaposition with the printing type, and a roller printer which is adapted to press the element against the printing type while the printing members are aligned by the final type positioning means.

7. A printer according to claim 6 wherein guiding surfaces are located on the printing members one adjacent each of the locating slots for guiding the centering bar into said approximately aligned row of locating slots.

8. A printer comprising a plurality of rotatably mounted printing members, resilient means for urging the printing members in a first direction, means for selectively positioning the printing members approximately in a printing station against the opposition of the resilient means, each of the printing members having a series of slots having radial index surfaces and a series of printing characters positioned with respect to the index surfaces, final type positioning means of a size to fit loosely in the slots, means for moving the type positioning means cyclically into cooperative relationship with an approximately aligned row of index surfaces to move the printing members further against the opposition of the resilient means and thus accurately align the printing members during a printing operation, and means for pressing an element to be printed against the printing characters while the printing members are finally aligned.

9. A printer comprising a plurality of rotatably mounted printing members, resilient means for urging the printing members in a first direction, means for selectively positioning the printing members approximately in a printing station against the opposition of the resilient means, each of the printing members having a series of radial index surfaces and a series of printing characters positioned with respect to the index surfaces, final type positioning means, means for moving the type positioning means cyclically into cooperative relationship with an approximately aligned row of index surfaces to move the printing members further against the opposition of the resilient means and thus align the printing members during a printing operation, and a roller printer for pressing an element to be printed against the finally aligned printing members on a forward printing stroke during one printing operation and for pressing another element to be printed against the finally aligned printing members on a return printing stroke during another printing operation and which includes means for shifting it relative to the printing members at the ends of such strokes to permit elements to be printed to be inserted between the roller printer and the printing members at the completion of such strokes.

10. A printer according to claim 9 wherein the roller printer includes means for automatically adjusting the pressure with which the roller printer presses the element against the printing members to accommodate elements of different thicknesses.

11. In a printer, in combination, a plurality of rotatably mounted printing members which are adapted to be selectively positioned approximately in a printing station and each of which has a series of locating slots having index sides and each of which has a series of printing type positioned with respect to the index sides of the locating slots, final type positioning means comprising a centering bar having a driving face which is received in an approximately aligned row of locating slots and means for urging the index sides in such row of locating slots against the driving face of the bar, whereby the locating slots may be of various widths and depths without affecting accurate alignment of the printing type, means for supporting an element to receive an imprint in juxtaposition with the printing type, and a roller printer for pressing the element against the finally aligned printing members on a forward printing stroke during one printing operation and for pressing another element against the finally aligned printing members on a return printing stroke during another printing operation and which includes means for shifting it relative to the printing members at the ends of such strokes to permit elements to be printed to be inserted between the roller printer and the printing members at the completion of such strokes.

12. A printer according to claim 11 wherein the roller printer includes means for automatically adjusting the pressure with which the roller printer presses the element against the printing members to accommodate elements of different thicknesses.

References Cited in the file of this patent

UNITED STATES PATENTS

| | | |
|---|---|---|
| 1,196,114 | Hume | Aug. 29, 1916 |
| 1,664,768 | Bull | Apr. 3, 1928 |
| 2,136,461 | Petty | Nov. 15, 1938 |
| 2,390,482 | Williams | Dec. 4, 1945 |
| 2,573,756 | Anderson | Nov. 6, 1951 |
| 2,735,362 | Williams | Feb. 21, 1956 |
| 2,746,384 | Bradley | May 22, 1956 |
| 2,766,687 | Williams | Oct. 16, 1956 |